(12) United States Patent
Nonoyama et al.

(10) Patent No.: US 11,600,831 B2
(45) Date of Patent: Mar. 7, 2023

(54) FUEL-CELL UNIT CELL

(71) Applicant: TOYOTA JIDOSHA KABUSHIKI KAISHA, Toyota (JP)

(72) Inventors: Nobuaki Nonoyama, Chiryu (JP); Hikaru Hasegawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 470 days.

(21) Appl. No.: 16/990,442

(22) Filed: Aug. 11, 2020

(65) Prior Publication Data

US 2021/0098798 A1 Apr. 1, 2021

(30) Foreign Application Priority Data

Sep. 30, 2019 (JP) .............................. JP2019-179533

(51) Int. Cl.
*H01M 8/0273* (2016.01)
*H01M 8/0258* (2016.01)
*H01M 8/1004* (2016.01)

(52) U.S. Cl.
CPC ....... *H01M 8/0273* (2013.01); *H01M 8/0258* (2013.01); *H01M 8/1004* (2013.01)

(58) Field of Classification Search
CPC ............. H01M 8/0273; H01M 8/0258; H01M 8/1004
See application file for complete search history.

(56) References Cited

U.S. PATENT DOCUMENTS

| 8,372,556 B2 * | 2/2013 | Goebel | H01M 8/241 |
| | | | 429/510 |
| 2005/0153185 A1 * | 7/2005 | Yoshida | H01M 8/028 |
| | | | 429/456 |
| 2012/0219874 A1 | 8/2012 | Suzuki et al. | |

(Continued)

FOREIGN PATENT DOCUMENTS

| DE | 102018204816 A1 | 10/2019 |
| EP | 1 921 701 A1 | 5/2008 |

(Continued)

OTHER PUBLICATIONS

U.S. Appl. No. 16/920,896, filed Jul. 6, 2020.

*Primary Examiner* — Milton I Cano
*Assistant Examiner* — Mary G Henshaw
(74) *Attorney, Agent, or Firm* — Finnegan, Henderson, Farabow, Garrett & Dunner, LLP

(57) ABSTRACT

Provided is a fuel-cell unit cell having a first gas diffusion layer that is laid on a first surface of a membrane-electrode assembly such that an outer peripheral edge portion thereof protrudes from the first surface of the membrane-electrode assembly. At a first part of the fuel-cell unit cell: the fuel-cell unit cell has a bonding layer; between the membrane-electrode assembly and a portion of the first gas diffusion layer on an inner side from the outer peripheral edge portion thereof, the bonding layer bonds the membrane-electrode assembly and the portion together; and between a support frame and the outer peripheral edge portion of the first gas diffusion layer, between the support frame and a first sepa- (Continued)

rator, and/or between the support frame and a second separator, the bonding layer bonds the support frame and the outer peripheral edge portion or the separator together.

4 Claims, 15 Drawing Sheets

(56) References Cited

U.S. PATENT DOCUMENTS

| | | |
|---|---|---|
| 2014/0017590 A1 | 1/2014 | Sugishita et al. |
| 2015/0357656 A1 | 12/2015 | Farrington et al. |
| 2016/0260989 A1 | 9/2016 | Ikeda et al. |
| 2017/0018785 A1 | 1/2017 | Ohmori et al. |

FOREIGN PATENT DOCUMENTS

| | | | |
|---|---|---|---|
| JP | 2015035313 A | * | 2/2015 |
| JP | 5681792 B2 | | 3/2015 |
| JP | 2016-503230 A | | 2/2016 |
| JP | 2016-162649 A | | 9/2016 |
| JP | 6145082 B2 | | 6/2017 |
| JP | 2017-168370 A | | 9/2017 |
| JP | 2017-182894 A | | 10/2017 |
| WO | WO 2011/019093 A1 | | 2/2011 |
| WO | WO 2012/137609 A1 | | 10/2012 |
| WO | WO 2014/111745 A2 | | 7/2014 |

* cited by examiner

FUEL-CELL UNIT CELL

INCORPORATION BY REFERENCE

The disclosure of Japanese Patent Application No. 2019-179533 filed on Sep. 30, 2019 including the specification, drawings and abstract is incorporated herein by reference in its entirety.

BACKGROUND

1. Technical Field

This disclosure relates to a fuel-cell unit cell.

2. Description of Related Art

In recent years, fuel cells that generate electricity by causing a chemical reaction between an anode gas, such as hydrogen, and a cathode gas, such as oxygen, have become known.

Among known fuel-cell unit cells that are constituent elements of such fuel cells, there are ones that have a configuration in which a gas diffusion layer and a separator are disposed on each surface of a membrane-electrode assembly having an electrolyte membrane and electrode catalyst layers respectively disposed on both surfaces of the electrolyte membrane.

Japanese Patent No. 5681792 discloses a structure of a fuel-cell unit cell in which a resin frame member is provided so as to surround a membrane-electrode assembly, and this resin frame member is partially fused to a gas diffusion layer to fix the membrane-electrode assembly and the resin frame member to each other.

Japanese Patent Application Publication No. 2016-162649 (JP 2016-162649 A) discloses a structure of a fuel-cell unit cell in which a membrane-electrode assembly and a support frame are fixed to each other by a bonding layer.

SUMMARY

The authors of this disclosure have found that the fuel-cell unit cells disclosed in Japanese Patent No. 5681792 and JP 2016-162649 A may deteriorate as an internal structure of the fuel-cell unit cells, for example, the membrane-electrode assembly or the gas diffusion layer tears and/or breaks during manufacturing of the fuel-cell unit cells, manufacturing of a fuel cell stack by stacking multiple fuel-cell unit cells, or usage of the fuel cell stack, i.e., generation of electricity.

This problem is more specifically described as follows.

The fuel-cell unit cells disclosed in Japanese Patent No. 5681792 and JP 2016-162649 A have a structure in which a support frame and a membrane-electrode assembly are bonded together by a bonding layer.

When a fuel-cell unit cell has this structure, stress may be applied to the support frame and the membrane-electrode assembly in an in-plane direction of the fuel-cell unit cell such that the two move away from or toward each other, during manufacturing of the fuel-cell unit cell or during manufacturing of a fuel cell stack by stacking multiple fuel-cell unit cells.

When a fuel-cell unit cell is used, the temperatures of members inside the fuel-cell unit cell change due to heat generated. If the support frame and the gas diffusion layer have different coefficients of thermal expansion, for example, if the support frame is formed by a resin sheet and the gas diffusion layer is formed by a non-woven carbon-fiber cloth or the like, the relationship between the relative positions of an end portion of the support frame facing the gas diffusion layer and the membrane-electrode assembly fixed to the gas diffusion layer may change due to heat generated during usage of the fuel-cell unit cell. This change may be accompanied by stress applied to the support frame and the membrane-electrode assembly in an in-plane direction of the fuel-cell unit cell such that the two move away from or toward each other.

A possible consequence is that the membrane-electrode assembly having relatively low strength may fracture by being stretched in an in-plane direction of the fuel-cell unit cell that is a direction toward an end portion of the fuel-cell unit cell, or may become wrinkled by being pressed in an in-plane direction of the fuel-cell unit cell that is a direction toward the center of the fuel-cell unit cell.

When the configuration in which there is a gap between a support frame and a gas diffusion layer as disclosed in JP 2016-162649 A is adopted, the portion of the fuel-cell unit cell where this gap is located, i.e., the portion where the membrane-electrode assembly is exposed may deform in a thickness direction and fracture due to a gas pressure difference between a cathode side and an anode side during usage of the fuel-cell unit cell.

Moreover, since the separator and the gas diffusion layer are not fixed to each other, when, for example, stress is applied to the fuel-cell unit cell from the outside and the fuel-cell unit cell warps in an in-plane direction, misalignment occurs between the separator and the gas diffusion layer such that the gas diffusion layer moves relatively to the separator in an in-plane direction that is a direction toward an end portion or the center of the fuel-cell unit cell, which may result in fracture of the membrane-electrode assembly having relatively low strength.

Gas diffusion layers used for fuel-cell unit cells in general are sometimes made of an electrically conductive porous material, such as non-woven carbon-fiber cloth. Some gas diffusion layers made of such a material have a rough end portion where, for example, carbon fibers are ruffled.

When such a gas diffusion layer is used, and the configuration in which a gas diffusion layer is directly laid on a first surface of a membrane-electrode assembly except for an outer peripheral edge portion of the membrane-electrode assembly as disclosed in Japanese Patent No. 5681792 and JP 2016-162649 A is adopted, the rough end portion of the gas diffusion layer, for example, the portion where carbon fibers are ruffled may dig into and damage the membrane-electrode assembly, and may further tear and/or break the membrane-electrode assembly, at a part where the end portion of the gas diffusion layer and the membrane-electrode assembly are in contact with each other.

If the membrane-electrode assembly gets damaged, the damaged portion becomes fragile and may lead to tear and/or breakage of the membrane-electrode assembly. If the membrane-electrode assembly tears and/or breaks, short-circuiting may occur inside the fuel-cell unit cell.

Thus, there is need for further enhancing the durability of fuel-cell unit cells.

This disclosure provides a fuel-cell unit cell having high mechanical durability.

The authors of this disclosure have found out the following solutions that can achieve this object:

First Aspect

A fuel-cell unit cell including:
(I) an electrode stack having
(a) a membrane-electrode assembly in which electrode catalyst layers are respectively laid on both surfaces of an electrolyte layer,
(b) a first gas diffusion layer laid on a first surface of the membrane-electrode assembly such that an outer peripheral edge portion of the first gas diffusion layer protrudes from the first surface of the membrane-electrode assembly, and
(c) a second gas diffusion layer laid on a second surface of the membrane-electrode assembly;
(II) a support frame disposed apart from the membrane-electrode assembly so as to surround the membrane-electrode assembly;
(III) a first separator that is laid on a side of the electrode stack on which the first gas diffusion layer is located, in contact with the first gas diffusion layer, and that is fixed to the support frame; and
(IV) a second separator that is laid on a side of the electrode stack on which the second gas diffusion layer is located, in contact with the second gas diffusion layer, and that is fixed to the support frame,
wherein, at a first part of the fuel-cell unit cell:
the fuel-cell unit cell has a bonding layer:
between the membrane-electrode assembly and a portion of the first gas diffusion layer on an inner side from the outer peripheral edge portion, the bonding layer bonds the membrane-electrode assembly and the portion together; and
between the support frame and the outer peripheral edge portion of the first gas diffusion layer, between the support frame and the first separator, and/or between the support frame and the second separator, the bonding layer bonds the support frame and the outer peripheral edge portion or the separator together.

Second Aspect

In the fuel-cell unit cell of the first aspect, the support frame may be disposed between the outer peripheral edge portion of the first gas diffusion layer and the second separator in a thickness direction of the fuel-cell unit cell.

Third Aspect

In the fuel-cell unit cell of the first aspect, the support frame may be disposed apart from the first gas diffusion layer so as to surround the first gas diffusion layer.

Fourth Aspect

In the fuel-cell unit cell of the second or third aspect, at a second part of the fuel-cell unit cell:
the second separator may have a reactant gas flow passage;
a second cover plate may be disposed between the second separator and the second gas diffusion layer, between the second separator and the outer peripheral edge portion of the first gas diffusion layer, and between the second separator and the support frame;
between the membrane-electrode assembly and the portion of the first gas diffusion layer on the inner side from the outer peripheral edge portion, the bonding layer may bond the membrane-electrode assembly and the portion together;
between the outer peripheral edge portion of the first gas diffusion layer and the second cover plate, the bonding layer may be bonded to the second cover plate;
between the support frame and the outer peripheral edge portion of the first gas diffusion layer, between the support frame and the first separator, and/or between the support frame and the second separator, the bonding layer may bond the support frame and the outer peripheral edge portion or the separator together; and
the bonding layer may be thus separated from the reactant gas flow passage of the second separator.

Fifth Aspect

In the fuel-cell unit cell of the fourth aspect, at the second part of the fuel-cell unit cell:
the first separator may also have a reactant gas flow passage;
a first cover plate may be disposed between the first separator and the first gas diffusion layer and between the first separator and the support frame;
between the support frame and the first cover plate, the bonding layer may bond these parts together; and
the bonding layer may be thus separated from the reactant gas flow passage of the first separator.

According to this disclosure, a fuel-cell unit cell having high mechanical durability can be provided.

BRIEF DESCRIPTION OF THE DRAWINGS

Features, advantages, and technical and industrial significance of exemplary embodiments of the disclosure will be described below with reference to the accompanying drawings, in which like signs denote like numerals, and wherein.

DETAILED DESCRIPTION OF EMBODIMENTS

Figure 1:
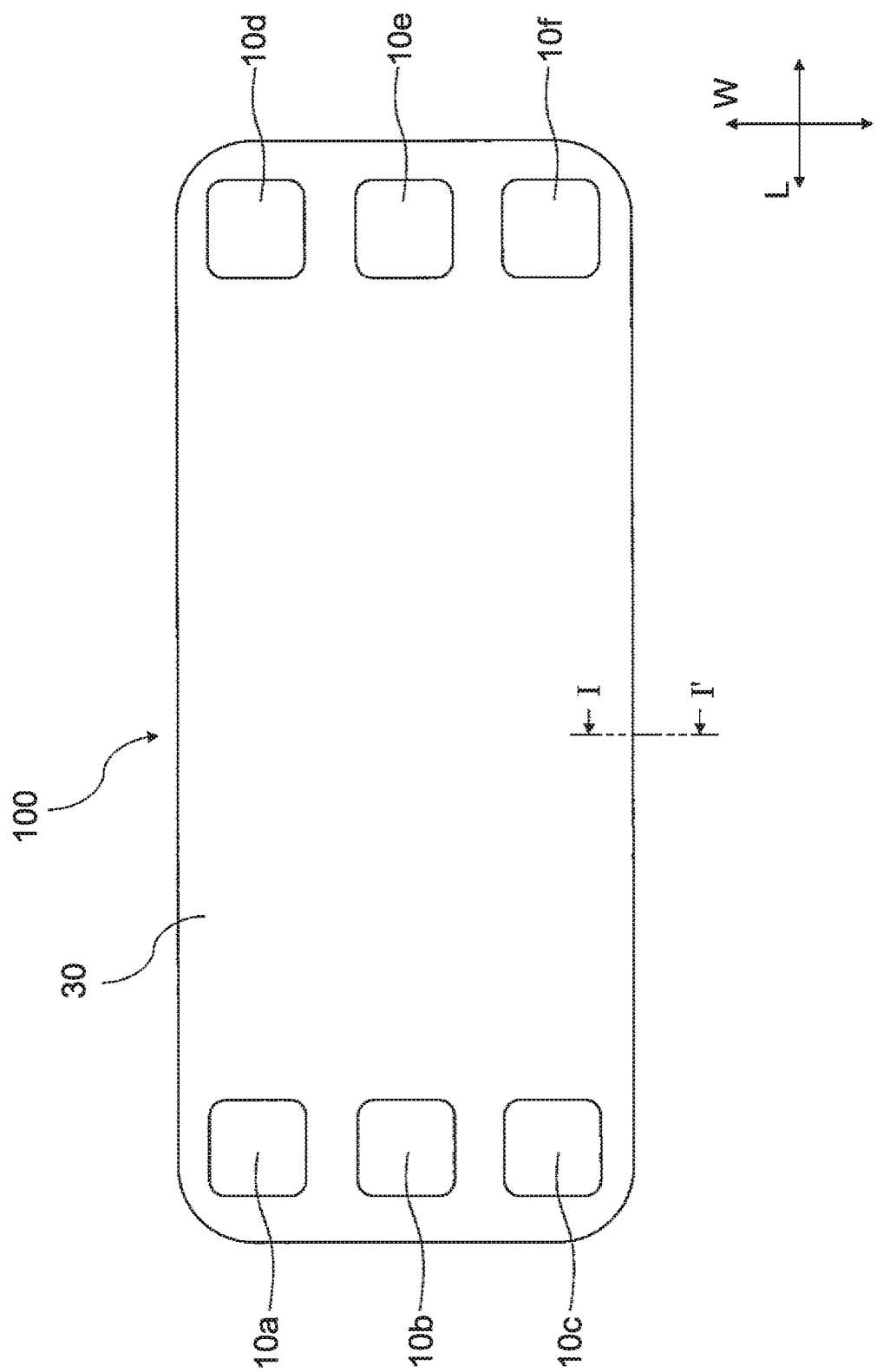
FIG. 1 is a schematic view of a fuel-cell unit cell 100 as seen from the side of a first separator 30.

Embodiments of this disclosure will be described in detail below. This disclosure is not limited to the following embodiments but can be implemented with various changes made thereto within the scope of the gist of the disclosure.

A fuel-cell unit cell of this disclosure has the following components:

(I) an electrode stack having
  (a) a membrane-electrode assembly in which electrode catalyst layers are respectively laid on both surfaces of an electrolyte layer,
  (b) a first gas diffusion layer laid on a first surface of the membrane-electrode assembly such that an outer peripheral edge portion thereof protrudes from the first surface of the membrane-electrode assembly, and
  (c) a second gas diffusion layer laid on a second surface of the membrane-electrode assembly;
(II) a support frame disposed apart from the membrane-electrode assembly so as to surround the membrane-electrode assembly:
(III) a first separator that is laid on a side of the electrode stack on which the first gas diffusion layer is located, in contact with the first gas diffusion layer, and that is fixed to the support frame; and
(IV) a second separator that is laid on a side of the electrode stack on which the second gas diffusion layer is located, in contact with the second gas diffusion layer, and that is fixed to the support frame.

At a first part of the fuel-cell unit cell of this disclosure: the fuel-cell unit cell further has a bonding layer; between the membrane-electrode assembly and a portion of the first gas diffusion layer on an inner side from the outer peripheral edge portion thereof, the bonding layer bonds the membrane-electrode assembly and the portion together; between the support frame and the outer peripheral edge portion of the first gas diffusion layer, between the support frame and the first separator, and/or between the support frame and the second separator, the bonding layer bonds the support frame and the outer peripheral edge portion or the separator together.

Unless otherwise mentioned in this disclosure, phrases referring to between two members, such as "between the membrane-electrode assembly and the portion of the first gas diffusion layer on the inner side from the outer peripheral edge portion thereof," "between the support frame and the outer peripheral edge portion of the first gas diffusion layer," "between the support frame and the first separator," and "between the support frame and the second separator," mean a space between the two members in a thickness direction of the fuel-cell unit cell.

That the support frame is "disposed apart from the membrane-electrode assembly so as to surround the membrane-electrode assembly" means that the support frame is disposed so as to surround the membrane-electrode assembly, without being in contact with the membrane-electrode assembly, in an in-plane direction of the fuel-cell unit cell.

As a more specific configuration, for example, the support frame may be disposed apart from the membrane-electrode assembly so as to surround the membrane-electrode assembly, and may be disposed between the outer peripheral edge portion of the first gas diffusion layer and the second separator in the thickness direction of the fuel-cell unit cell.

Further, for example, the support frame may be disposed apart from the first gas diffusion layer so as to surround the first gas diffusion layer in an in-plane direction of the fuel-cell unit cell.

First Part

While the position of the first part in the fuel-cell unit cell of this disclosure is not particularly limited, the first part may be located, for example, at an outer peripheral edge portion of the fuel-cell unit cell. More specifically, the first part may be located at a portion corresponding to the portion of the fuel-cell unit cell where section I-r shown in FIG. 1 is located.

At the first part of the fuel-cell unit cell of this disclosure: the fuel-cell unit cell has the bonding layer; between the membrane-electrode assembly and the portion of the first gas diffusion layer on the inner side from the outer peripheral edge portion thereof, the bonding layer bonds the membrane-electrode assembly and the portion together; and between the support frame and the outer peripheral edge portion of the first gas diffusion layer, between the support frame and the first separator, and/or between the support frame and the second separator, the bonding layer bonds the support frame and the outer peripheral edge portion or the separator together.

When the fuel-cell unit cell of this disclosure has the structure in which the support frame is disposed between the outer peripheral edge portion of the first gas diffusion layer and the second separator in the thickness direction of the fuel-cell unit cell, the first part of the fuel-cell unit cell of this disclosure may have a structure in which, between the membrane-electrode assembly and the portion of the first gas diffusion layer on the inner side from the outer peripheral edge portion thereof, the bonding layer bonds the membrane-electrode assembly and the portion together, and between the support frame and the outer peripheral edge portion of the first gas diffusion layer and/or between the support frame and the second separator, the bonding layer bonds the support frame and the outer peripheral edge portion or the separator together.

In this configuration, the first part of the fuel-cell unit cell of this disclosure may have a structure in which the bonding layer bonds also the support frame and the first separator together.

When the fuel-cell unit cell of this disclosure has the structure in which the support frame is disposed apart from the first gas diffusion layer so as to surround the first gas diffusion layer, the first part of the fuel-cell unit cell of this disclosure may have a structure in which, between the membrane-electrode assembly and the portion of the first gas diffusion layer on the inner side from the outer peripheral edge portion thereof, the bonding layer bonds the membrane-electrode assembly and the portion together, and between the support frame and the first separator and/or between the support frame and the second separator, the bonding layer bonds these parts together.

The principle underlying the high mechanical durability of the fuel-cell unit cell of this disclosure is, without it limiting the disclosure, as follows:

The first part of fuel-cell unit cell of this disclosure has the above-described configuration in which the support frame, particularly a leading end portion thereof facing the membrane-electrode assembly, is bonded to the first gas diffusion layer, the first separator, and/or the second separator by the bonding layer, and the first gas diffusion layer and the membrane-electrode assembly are bonded together by the bonding layer.

Thus, the relationship between the relative positions of the support frame and the membrane-electrode assembly is less likely to change even when stress is applied to the support frame and the membrane-electrode assembly in an in-plane direction of the fuel-cell unit cell such that the two move away from or toward each other, during manufacturing of the fuel-cell unit cell or during manufacturing of a fuel cell stack by stacking multiple fuel-cell unit cells. Further, the relationship between the relative positions of the support frame and the membrane-electrode assembly is less likely to change even when the support frame expands or contracts due to temperature changes during usage of the fuel cell, i.e., generation of electricity.

The first part of the fuel-cell unit cell of this disclosure has the above-described configuration in which both surfaces of the membrane-electrode assembly are respectively covered with the first and second gas diffusion layers and not exposed in the thickness direction of the fuel-cell unit cell.

Thus, the membrane-electrode assembly is less likely to deform due to a gas pressure difference between the cathode side and the anode side.

The first part of the fuel-cell unit cell of this disclosure has the above-described configuration in which the support frame, particularly the leading end portion thereof facing the membrane-electrode assembly, is bonded to the first gas diffusion layer, the first separator, and/or the second separator by the bonding layer, and the first gas diffusion layer and the membrane-electrode assembly are bonded together by the bonding layer.

Thus, the relationship between the relative positions in an in-plane direction of the fuel-cell unit cell of the membrane-electrode assembly and the support frame, particularly the leading end portion thereof facing the membrane-electrode assembly, is less likely to change even when, for example, stress is applied to the fuel-cell unit cell from the outside and the fuel-cell unit cell warps in an in-plane direction that is a direction toward an end portion or the center of the fuel-cell unit cell. As a result, stress applied to the membrane-electrode assembly in an in-plane direction is reduced, and the membrane-electrode assembly is less likely to fracture.

Moreover, the first part of the fuel-cell unit cell of this disclosure has the above-described configuration in which the outer peripheral edge portion of the first gas diffusion layer protrudes from the first surface of the membrane-electrode assembly and a leading end portion of the first gas diffusion layer is not in contact with the membrane-electrode assembly.

Thus, even when the gas diffusion layer has a rough end portion, for example, even when the gas diffusion layer made of an electrically conductive porous material, such as non-woven carbon-fiber cloth, has an end portion where carbon fibers are ruffled, it is less likely that the rough end portion of the first gas diffusion layer, for example, the portion where carbon fibers are ruffled may tear and/or break the membrane-electrode assembly by digging into the membrane-electrode assembly or damaging and further making a hole in the membrane-electrode assembly.

For these reasons, the fuel-cell unit cell of this disclosure has high mechanical durability.

This principle will be more specifically described using examples of fuel-cell unit cells according to embodiments of this disclosure and a fuel-cell unit cell that is not an embodiment of this disclosure.

First, specific examples of the fuel-cell unit cell of this disclosure in the case where the support frame is disposed between the outer peripheral edge portion of the first gas diffusion layer and the second separator in the thickness direction of the fuel-cell unit cell will be described using FIG. 1 to FIG. 4.

FIG. 1 is a schematic view of a fuel-cell unit cell 100 as seen from the side of a first separator 30. In FIG. 1, L and W represent a longitudinal direction of the fuel-cell unit cell and a width direction of the fuel-cell unit cell, respectively.

As shown in FIG. 1, the fuel-cell unit cell 100 has, on the side of the first separator 30, first gas pass-through openings 10a, 10f, coolant pass-through openings 10b, 10e, and second gas pass-through openings 10c, 10d.

Figure 2:
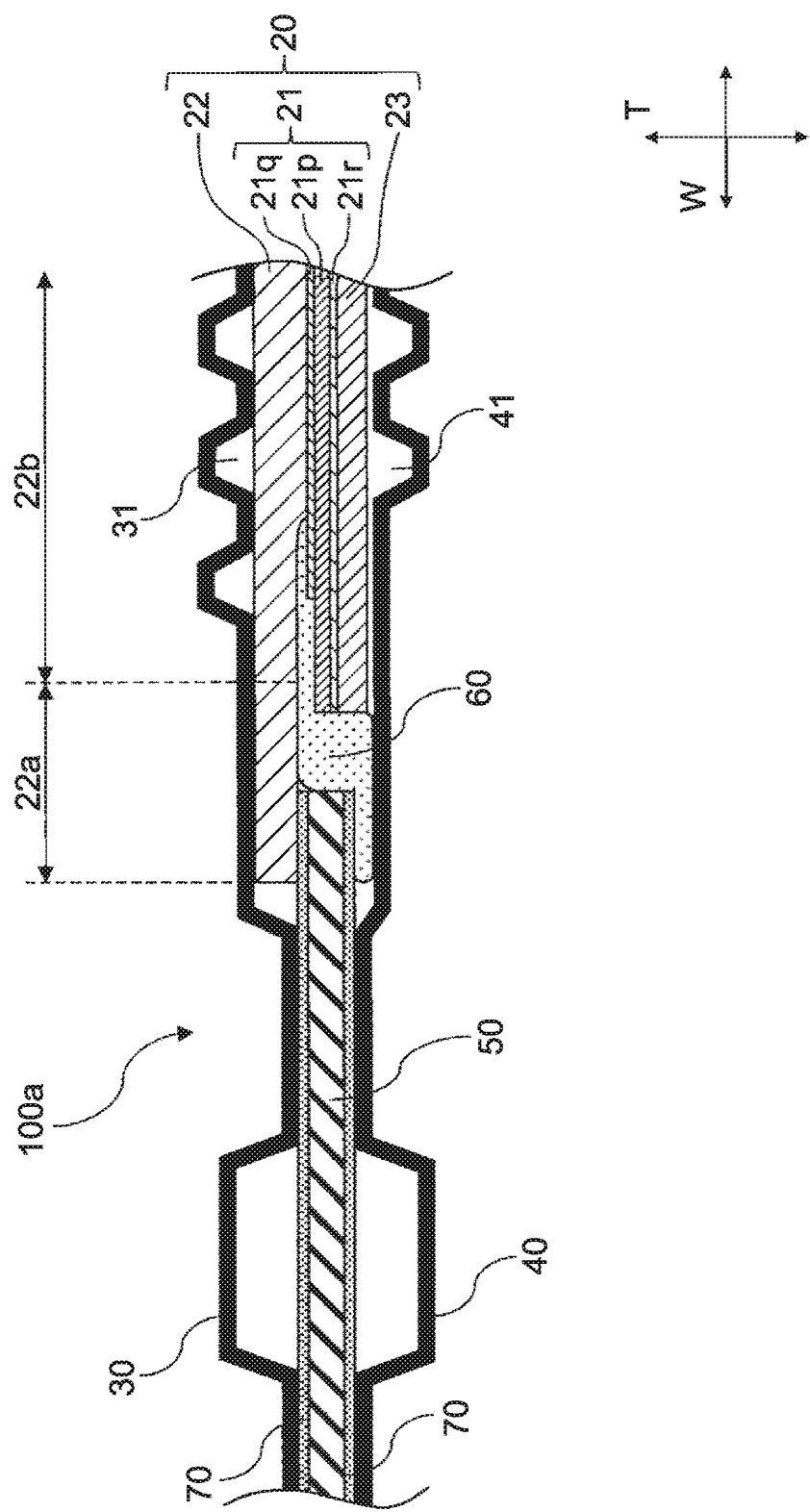
FIG. 2 is a sectional view of a fuel-cell unit cell 100a according to a first embodiment of this disclosure, taken along a section similar to section I-I' of FIG. 1.

FIG. 2 is a sectional view of a fuel-cell unit cell 100a according to a first embodiment of this disclosure, taken along a section similar to section I-I' of FIG. 1. In FIG. 2, the left side is a side closer to an end portion in an in-plane direction of the fuel-cell unit cell, and the right side is a side closer to the center in an in-plane direction of the fuel-cell unit cell. The same applies to FIG. 3 to FIG. 7 and FIG. 10 to FIG. 15.

As shown in FIG. 2, the fuel-cell unit cell 100a according to the first embodiment of this disclosure has an electrode stack 20. The electrode stack 20 has: a membrane-electrode assembly 21 in which electrode catalyst layers 21q, 21r are respectively laid on both surfaces of an electrolyte layer 21p; a first gas diffusion layer 22 laid on a first surface of the membrane-electrode assembly 21 such that an outer peripheral edge portion 22a thereof protrudes from the first surface of the membrane-electrode assembly 21; and a second gas diffusion layer 23 laid on a second surface of the membrane-electrode assembly 21.

The fuel-cell unit cell 100a according to the first embodiment of this disclosure further has: a support frame 50 disposed apart from the membrane-electrode assembly 21 so as to surround the membrane-electrode assembly 21; the first separator 30 that is laid on a side of the electrode stack 20 on which the first gas diffusion layer 22 is located, in contact with the first gas diffusion layer 22, and that is fixed to the support frame 50; and a second separator 40 that is laid on a side of the electrode stack 20 on which the second gas diffusion layer 23 is located, in contact with the second gas diffusion layer 23, and that is fixed to the support frame 50.

Here, the support frame 50 is disposed between the outer peripheral edge portion 22a of the first gas diffusion layer 22 and the second separator 40 in the thickness direction of the fuel-cell unit cell 100a.

At a first part of the fuel-cell unit cell 100a according to the first embodiment of this disclosure, the fuel-cell unit cell 100a has a bonding layer 60, and the bonding layer 60 bonds together the membrane-electrode assembly 21 and a portion 22b of the first gas diffusion layer 22 on an inner side from the outer peripheral edge portion thereof. More specifically, in the fuel-cell unit cell 100a according to the first embodiment of this disclosure, the electrode catalyst layer 21q is disposed on an inner side of an outer periphery of the electrolyte layer 21p, and the bonding layer 60 bonds together the electrolyte layer 21p and the portion 22b of the first gas diffusion layer 22 on the inner side from the outer peripheral edge portion thereof. The bonding layer 60 bonds also the support frame 50 and the second separator 40 together. Although this is not shown, when an end portion of the electrode catalyst layer 21q reaches an end portion of the electrolyte layer 21p, the bonding layer 60 may bond together the electrode catalyst layer 21q and the portion 22b of the first gas diffusion layer 22 on the inner side from the outer peripheral edge portion thereof. If the electrode catalyst layer 21q is porous in this case, the bonding layer 60 may be fused, for example, to a porous portion of the electrode catalyst layer 21q.

In the fuel-cell unit cell 100a according to the first embodiment of this disclosure, the first separator 30 and the second separator 40 are each fixed to the support frame 50 by a bonding layer 70 separate from the bonding layer 60.

At the first part of the fuel-cell unit cell 100a according to the first embodiment of this disclosure, the support frame 50, particularly a leading end portion thereof facing the membrane-electrode assembly 21, is bonded to the second separator 40 by the bonding layer 60, and the first gas diffusion layer 22 and the membrane-electrode assembly 21 are bonded together by the bonding layer 60. Thus, the relationship between the relative positions of the support frame 50 and the membrane-electrode assembly 21 is less likely to change even when stress is applied to the fuel-cell unit cell 100a in an in-plane direction or when the support frame 50 expands or contracts due to heat generated in the fuel-cell unit cell 100a or when the fuel-cell unit cell 100a warps in an in-plane direction that is a direction toward an end portion or the center of the fuel-cell unit cell 100a.

In the fuel-cell unit cell 100a according to the first embodiment of this disclosure, the first gas diffusion layer 22 is disposed on the first surface of the membrane-electrode assembly 21 such that the outer peripheral edge portion 22a thereof protrudes from the first surface of the membrane-electrode assembly 21, so that both surfaces of the membrane-electrode assembly 21 are respectively covered with the first gas diffusion layer 22 and the second gas diffusion layer 23 and not exposed in the thickness direction of the fuel-cell unit cell 100a. Thus, the membrane-electrode assembly 21 is less likely to deform due to a gas pressure difference between the cathode side and the anode side. Further, since a leading end portion of the first gas diffusion layer 22 is not in contact with a surface of the membrane-electrode assembly 21 in this configuration, it is less likely that the rough end portion of the first gas diffusion layer 22, for example, the portion where carbon fibers are ruffled may tear and/or break the membrane-electrode assembly 21 by digging into the membrane-electrode assembly 21 or damaging and further making a hole in the membrane-electrode assembly 21.

Therefore, the fuel-cell unit cell 100a according to the first embodiment of this disclosure has high mechanical durability.

Figure 3:
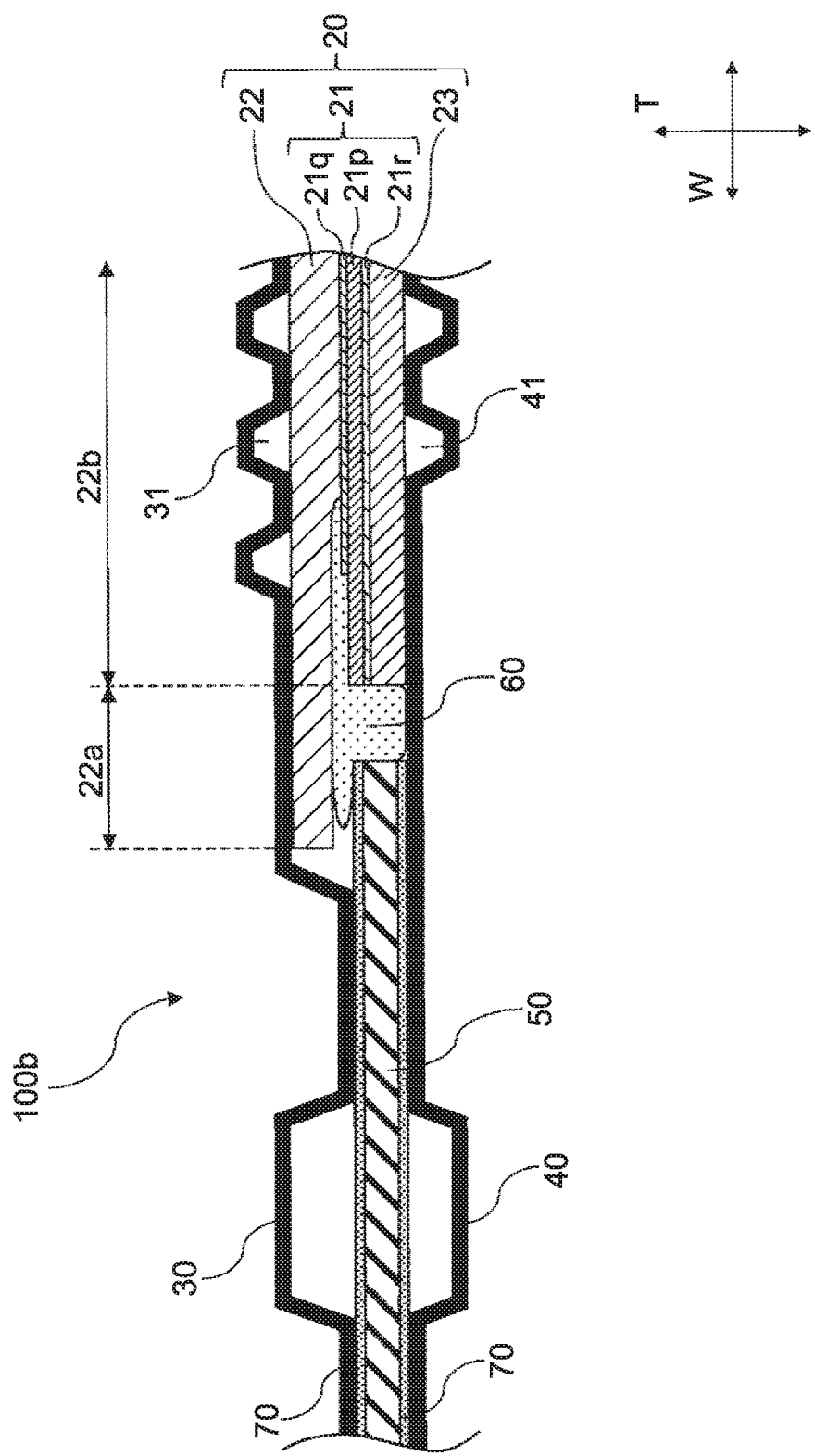
FIG. 3 is a sectional view of a fuel-cell unit cell 100b according to a second embodiment of this disclosure, taken along a section similar to section I-I' of FIG. 1.

FIG. 3 is a sectional view of a fuel-cell unit cell 100b according to a second embodiment of this disclosure, taken along a section similar to section I-I' of FIG. 1.

As shown in FIG. 3, the fuel-cell unit cell 100b according to the second embodiment of this disclosure has the same configuration as the fuel-cell unit cell 100a according to the first embodiment of this disclosure shown in FIG. 2, except that the support frame 50 and the second separator 40 are not bonded together by the bonding layer 60 and that the support frame 50 and the outer peripheral edge portion 22a of the first gas diffusion layer 22 are bonded together by the bonding layer 60.

At a first part of the fuel-cell unit cell 100b according to the second embodiment of this disclosure, the support frame 50, particularly the leading end portion thereof facing the membrane-electrode assembly 21, is bonded to the outer peripheral edge portion 22a of the first gas diffusion layer 22 by the bonding layer 60, and the first gas diffusion layer 22 and the membrane-electrode assembly 21 are bonded together by the bonding layer 60. Thus, the relationship between the relative positions of the support frame 50 and the membrane-electrode assembly 21 is less likely to change, as in the fuel-cell unit cell 100a according to the first embodiment of this disclosure.

In the fuel-cell unit cell 100b according to the second embodiment of this disclosure, the configuration of the electrode stack is the same as in the fuel-cell unit cell 100a according to the first embodiment of this disclosure, so that the membrane-electrode assembly 21 is less likely to tear and/or break.

Therefore, the fuel-cell unit cell 100b according to the second embodiment of this disclosure has high mechanical durability.

Figure 4:
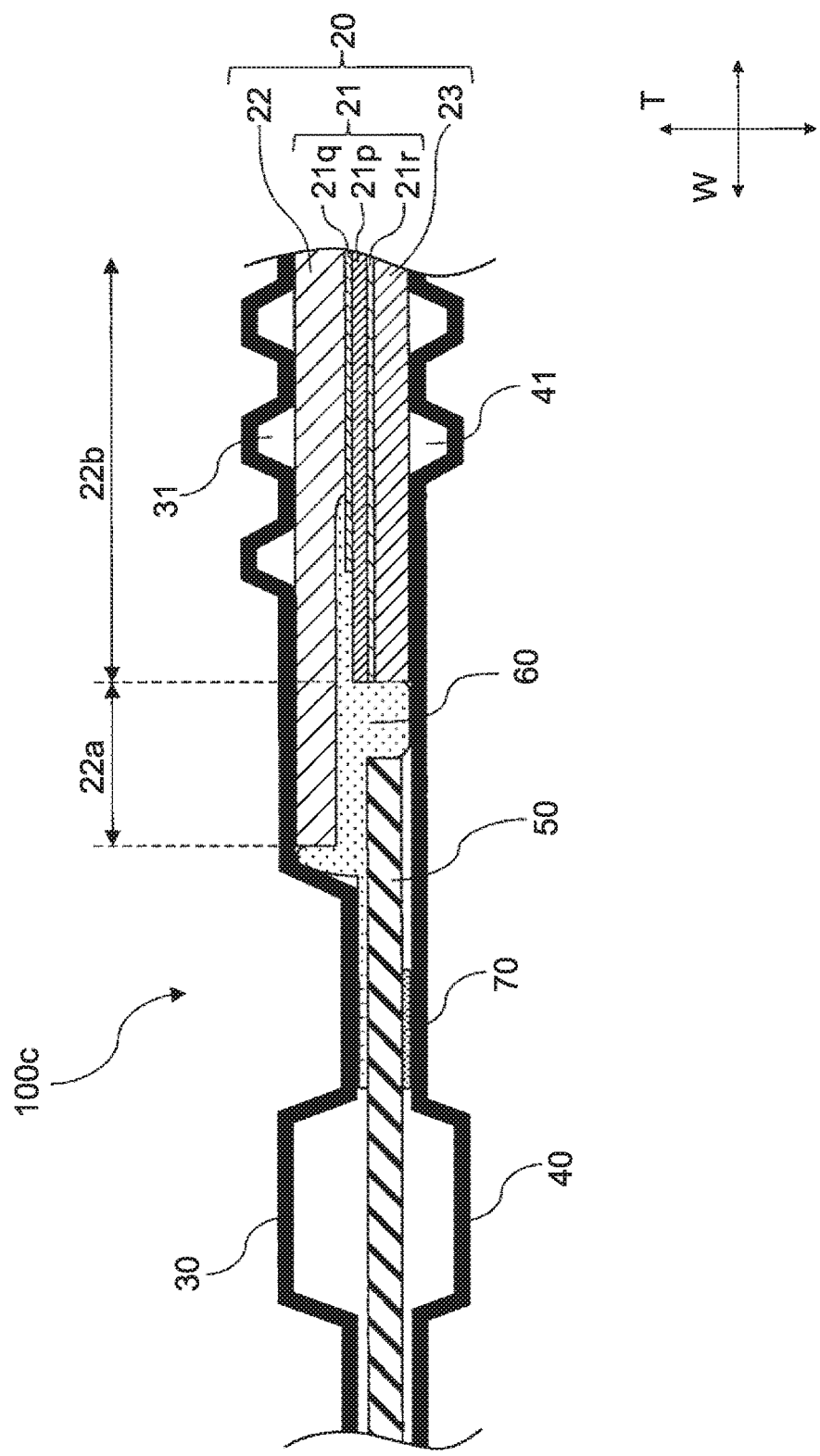
FIG. 4 is a sectional view of a fuel-cell unit cell 100c according to a third embodiment of this disclosure, taken along a section similar to section I-I' of FIG. 1.

FIG. 4 is a sectional view of a fuel-cell unit cell 100c according to a third embodiment of this disclosure, taken along a section similar to section I-I' of FIG. 1.

As shown in FIG. 4, the fuel-cell unit cell 100c according to the third embodiment of this disclosure is different from the fuel-cell unit cells 100a, 100b according to the first and second embodiments of this disclosure in that the support frame 50 is fixed to the first separator 30 by the bonding layer 60 and fixed to the second separator 40 by a separate bonding layer 70. The other configurations of the fuel-cell unit cell 100c are the same as in the fuel-cell unit cell 100b according to the second embodiment of this disclosure shown in FIG. 3.

The fuel-cell unit cell 100c according to the third embodiment of this disclosure has high mechanical durability for the same reasons as the fuel-cell unit cell 100b according to the second embodiment of this disclosure shown in FIG. 3.

Next, specific examples of the fuel-cell unit cell of this disclosure in the case where the support frame is disposed apart from the first gas diffusion layer so as to surround the first gas diffusion layer will be described using FIG. 5 to FIG. 7.

Figure 5:
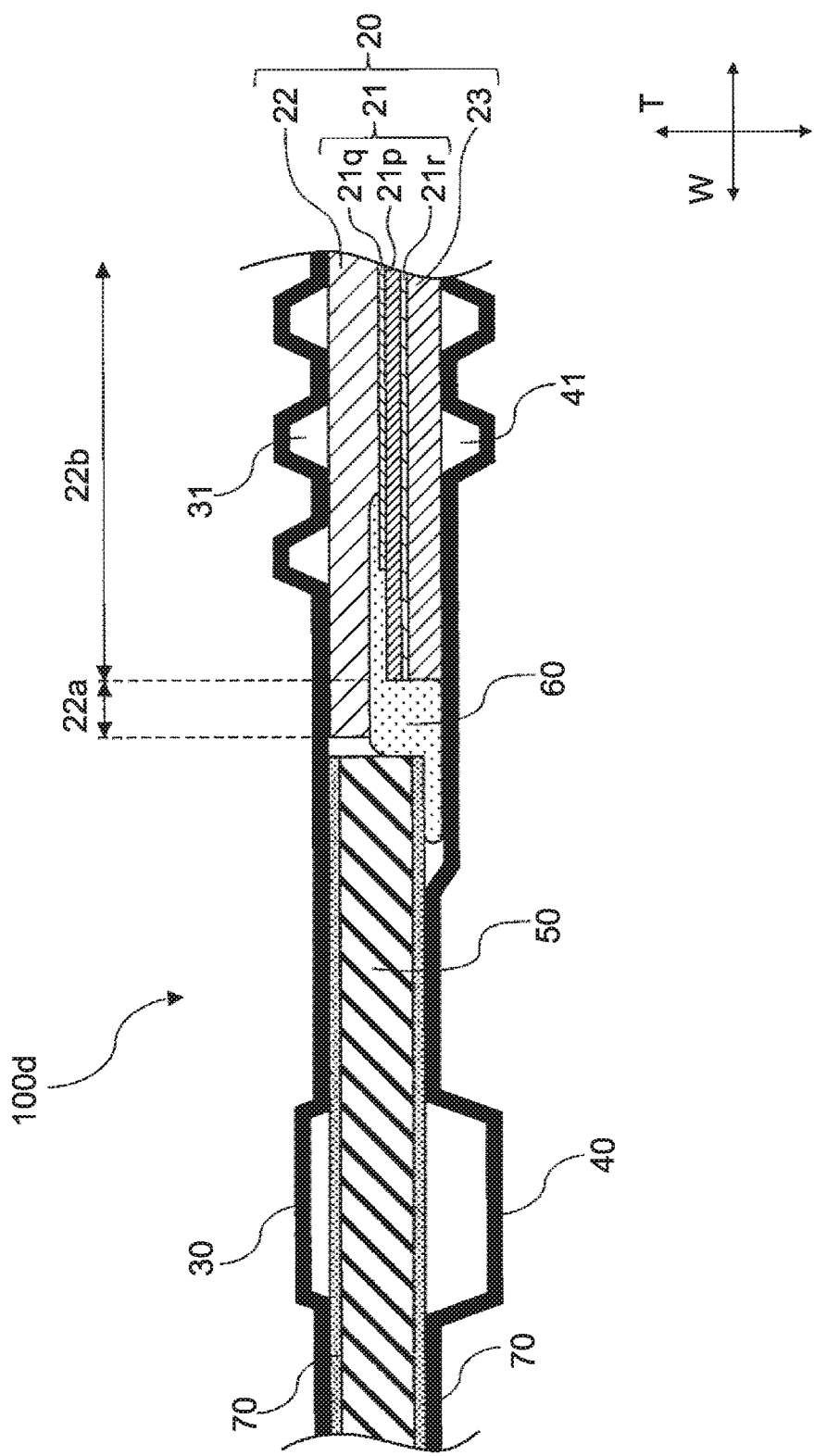
FIG. 5 is a sectional view of a fuel-cell unit cell 100d according to a fourth embodiment of this disclosure, taken along a section similar to section I-I' of FIG. 1.

FIG. 5 is a sectional view of a fuel-cell unit cell 100d according to a fourth embodiment of this disclosure, taken along a section similar to section I-I' of FIG. 1.

As shown in FIG. 5, the fuel-cell unit cell 100d according to the fourth embodiment of this disclosure has the electrode stack 20 having the same configuration as in the fuel-cell unit cell 100a according to the first embodiment of this disclosure.

The fuel-cell unit cell 100d according to the fourth embodiment of this disclosure has the first separator 30 and the second separator 40 and is the same as the fuel-cell unit cell 100a according to the first embodiment of this disclosure, except that the support frame 50 is disposed apart from the first gas diffusion layer 22 so as to surround the first gas diffusion layer 22.

At a first part of the fuel-cell unit cell 100d according to the fourth embodiment of this disclosure, the support frame 50, particularly the leading end portion thereof facing the membrane-electrode assembly 21, is bonded to the second separator 40 by the bonding layer 60, and the first gas diffusion layer 22 and the membrane-electrode assembly 21 are bonded together by the bonding layer 60. Thus, the relationship between the relative positions of the support frame 50 and the membrane-electrode assembly 21 is less likely to change even when stress is applied to the fuel-cell unit cell 100d in an in-plane direction or when the support frame 50 expands or contracts due to heat generated in the fuel-cell unit cell 100d or when the fuel-cell unit cell 100d warps in an in-plane direction that is a direction toward an end portion or the center of the fuel-cell unit cell.

In the fuel-cell unit cell 100d according to the fourth embodiment of this disclosure, the configuration of the electrode stack is the same as in the fuel-cell unit cell 100a according to the first embodiment of this disclosure, so that the membrane-electrode assembly 21 is less likely to tear and/or break.

Therefore, the fuel-cell unit cell 100*d* according to the fourth embodiment of this disclosure has high mechanical durability.

Figure 6:
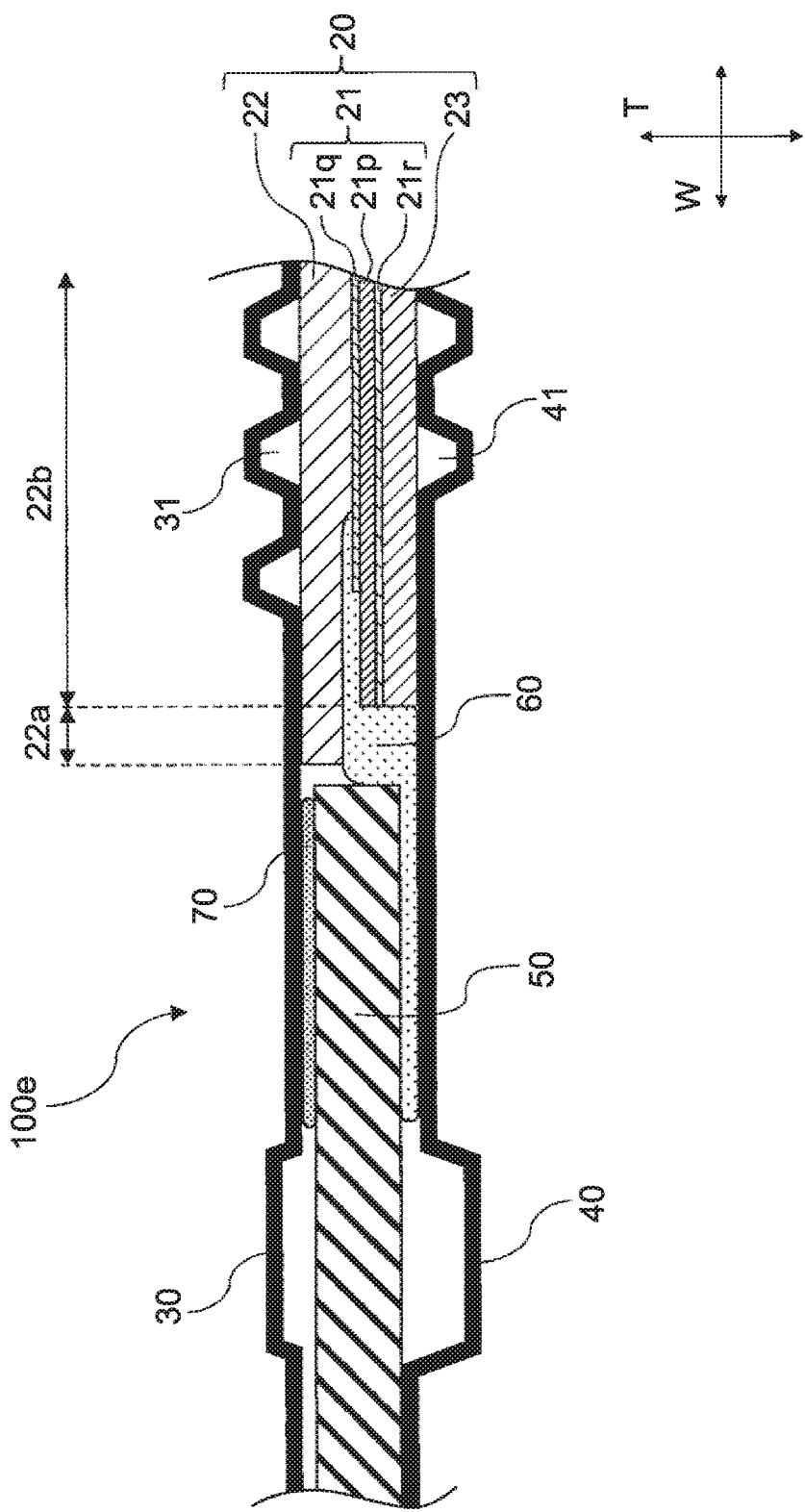
FIG. 6 is a sectional view of a fuel-cell unit cell 100e according to a fifth embodiment of this disclosure, taken along a section similar to section I-I' of FIG. 1.

FIG. 6 is a sectional view of a fuel-cell unit cell 100*e* according to a fifth embodiment of this disclosure, taken along a section similar to section I-I' of FIG. 1.

As shown in FIG. 6, the fuel-cell unit cell 100*e* according to the fifth embodiment of this disclosure is different from the fuel-cell unit cell 100*d* according to the fourth embodiment of this disclosure in that the separate bonding layer 70 that fixes the support frame 50 and the second separator 40 to each other is not provided, and that instead the bonding layer 60 fixes the support frame 50 and the second separator 40 to each other by extending farther in an in-plane direction of the fuel-cell unit cell that is a direction toward an end portion of the fuel-cell unit cell. The other configurations of the fuel-cell unit cell 100*e* are the same as in the fuel-cell unit cell 100*d* according to the fourth embodiment of this disclosure shown in FIG. 5.

The fuel-cell unit cell 100*e* according to the fifth embodiment of this disclosure has high mechanical durability for the same reasons as the fuel-cell unit cell 100*d* according to the fourth embodiment of this disclosure shown in FIG. 5.

Figure 7:
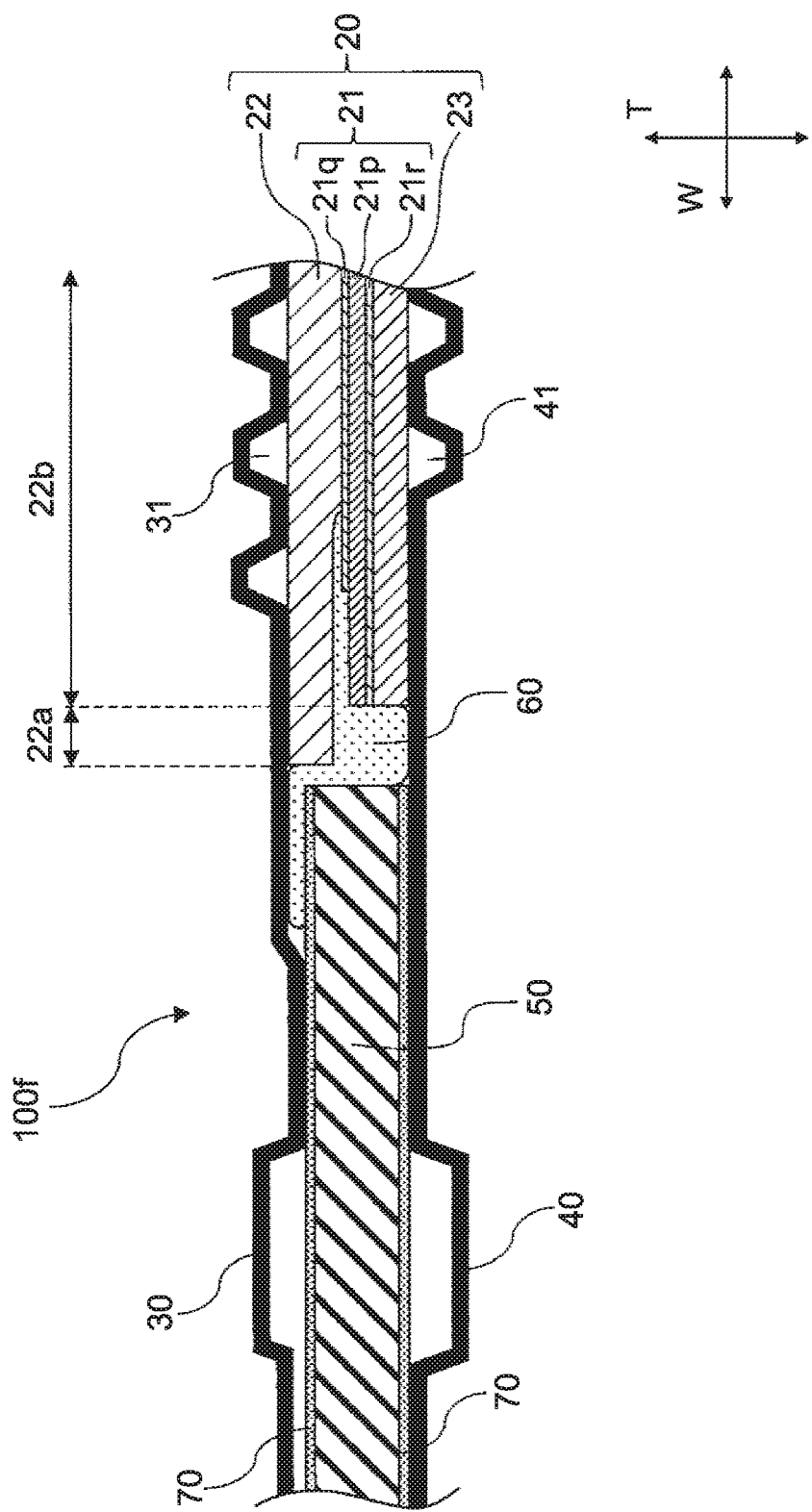
FIG. 7 is a sectional view of a fuel-cell unit cell 100f according to a sixth embodiment of this disclosure, taken along a section similar to section I-I' of FIG. 1.

FIG. 7 is a sectional view of a fuel-cell unit cell 100*f* according to a sixth embodiment of this disclosure, taken along a section similar to section I-I' of FIG. 1.

As shown in FIG. 7, the fuel-cell unit cell 100*f* according to the sixth embodiment of this disclosure has the same configuration as the fuel-cell unit cell 100*d* according to the fourth embodiment of this disclosure shown in FIG. 5, except that the support frame 50 and the second separator 40 are not bonded together by the bonding layer 60 and that the support frame 50 and the first separator 30 are bonded together by the bonding layer 60.

At a first part of the fuel-cell unit cell 100*f* according to the sixth embodiment of this disclosure, the support frame 50, particularly the leading end portion thereof facing the membrane-electrode assembly 21, is bonded to the first separator 30 by the bonding layer 60, and the first gas diffusion layer 22 and the membrane-electrode assembly 21 are bonded together by the bonding layer 60. Thus, the relationship between the relative positions of the support frame 50 and the membrane-electrode assembly 21 is less likely to change, as in the fuel-cell unit cell 100*d* according to the fourth embodiment of this disclosure.

In the fuel-cell unit cell 100*f* according to the sixth embodiment of this disclosure, the configuration of the electrode stack is the same as in the fuel-cell unit cell 100*d* according to the fourth embodiment of this disclosure, so that the membrane-electrode assembly 21 is less likely to tear and/or break.

Therefore, the fuel-cell unit cell 100*f* according to the sixth embodiment of this disclosure has high mechanical durability.

Finally, a specific example of a fuel-cell unit cell that is not an embodiment of this disclosure will be described using FIG. 8.

Figure 8:
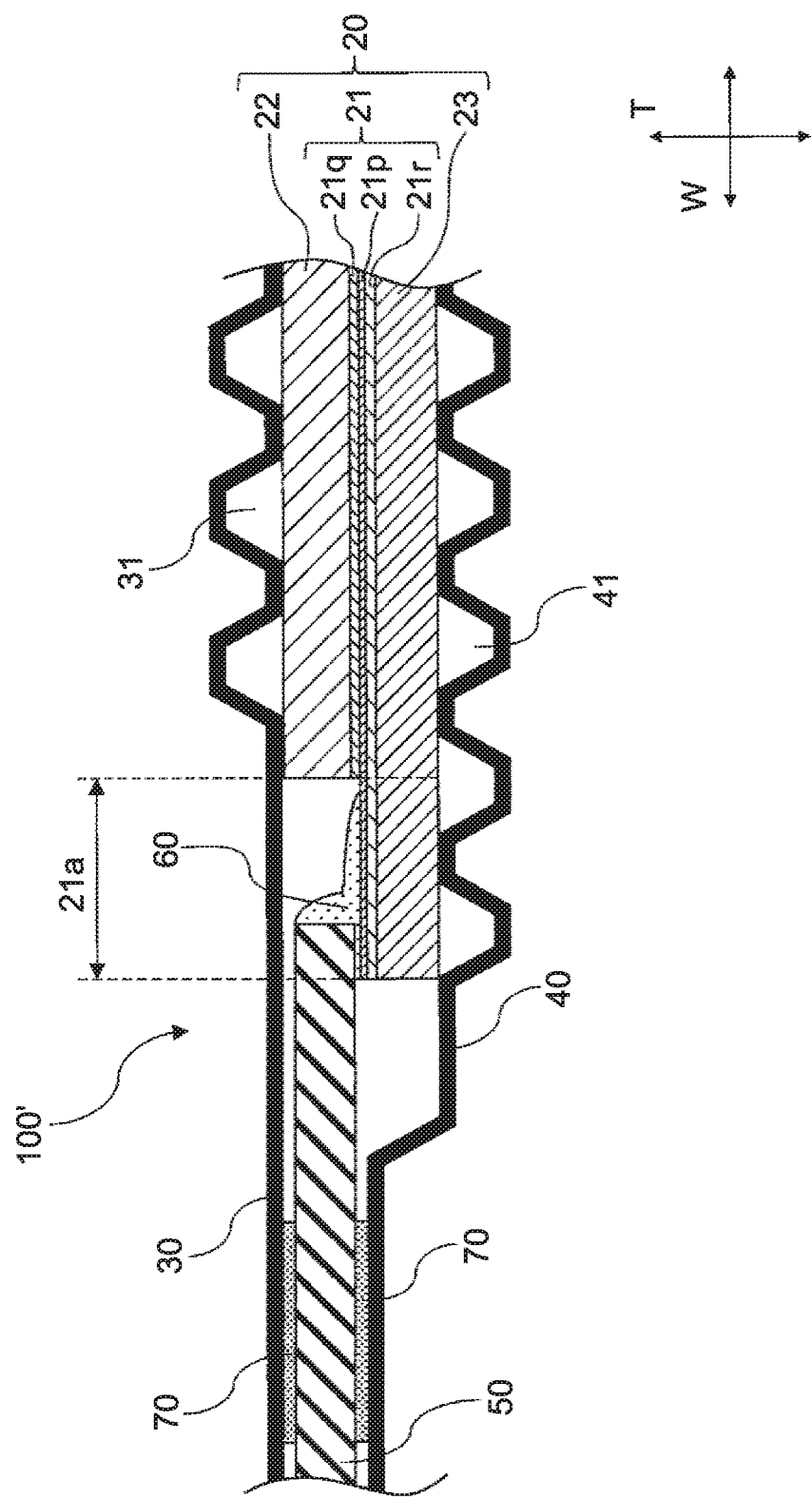
FIG. 8 is a sectional view of a fuel-cell unit cell 100' that is not an embodiment of this disclosure, taken along a section similar to section I-I' of FIG. 1.

In a fuel-cell unit cell 100' as shown in FIG. 8 that is not an embodiment of this disclosure, the support frame 50 and the membrane-electrode assembly 21 are bonded together by the bonding layer 60 but the first separator 30 and the first gas diffusion layer 22 are not bonded to the support frame 50.

Thus, when stress is applied to the support frame 50 and the membrane-electrode assembly 21 in an in-plane direction of the fuel-cell unit cell 100', for example, in a width direction W such that the two move away from or toward each other, the relationship between the relative positions of the support frame 50 and the membrane-electrode assembly 21 is likely to change, resulting in fracture of the membrane-electrode assembly 21.

Since the end portion of the support frame 50 facing the first gas diffusion layer 22 is not bonded to the first separator, the relationship between the relative positions of the end portion of the support frame facing the gas diffusion layer and the membrane-electrode assembly fixed to the gas diffusion layer is likely to change due to heat generated during usage of the fuel-cell unit cell 100', resulting in fracture of the membrane-electrode assembly 21.

Since there is a portion between the first separator 30 and an outer peripheral edge portion 21*a* of the membrane-electrode assembly 21 where the bonding layer 60 is not bonded to the outer peripheral edge portion 21*a* of the membrane-electrode assembly 21, the membrane-electrode assembly 21 is likely to deform due to a gas pressure difference between the cathode side and the anode side during usage of the fuel-cell unit cell.

Since the first separator 30, the first gas diffusion layer 22, and the support frame 50 are not bonded to one another by the bonding layer 60, when, for example, stress is applied to the fuel-cell unit cell 100' from the outside and the fuel-cell unit cell 100' warps in an in-plane direction, for example, in the width direction W toward an end portion or the center of the fuel-cell unit cell 100', the relationship between the relative positions of these members is likely to change, resulting in fracture of especially the membrane-electrode assembly 21 that has low strength.

Since there is a portion between the first separator 30 and the outer peripheral edge portion 21*a* of the membrane-electrode assembly 21 where the bonding layer 60 is not bonded to the outer peripheral edge portion 21*a* of the membrane-electrode assembly 21, this portion of the membrane-electrode assembly 21 is likely to deform and get damaged due to a gas pressure difference between the cathode side and the anode side during usage of the fuel-cell unit cell.

Moreover, since the end portion of the first gas diffusion layer 22 and the membrane-electrode assembly 21 are directly in contact with each other, the rough end portion of the first gas diffusion layer 22 may damage and further make a hole in the membrane-electrode assembly 21, at the part where the end portion of the first gas diffusion layer 22 and the membrane-electrode assembly 21 are in contact with each other.

For these reasons, the mechanical durability of the fuel-cell unit cell 100' that is not an embodiment of this disclosure is lower than that of the fuel-cell unit cells according to the embodiments of this disclosure.

Second Part

While the position of the second part in the fuel-cell unit cell of this disclosure is not particularly limited, the second part may be located, for example, at a position where the second separator has a reactant gas flow passage and the bonding layer is likely to penetrate into the reactant gas flow passage, more particularly, at a portion where the reactant gas flow passage overlaps an outer peripheral edge portion of the second gas diffusion layer in the thickness direction of the fuel-cell unit cell.

Alternatively, the second part in the fuel-cell unit cell of this disclosure may be located at a position at which not only the second separator but also the first separator has a reactant gas flow passage and the bonding layer is likely to penetrate into the reactant gas flow passage.

Figure 9:
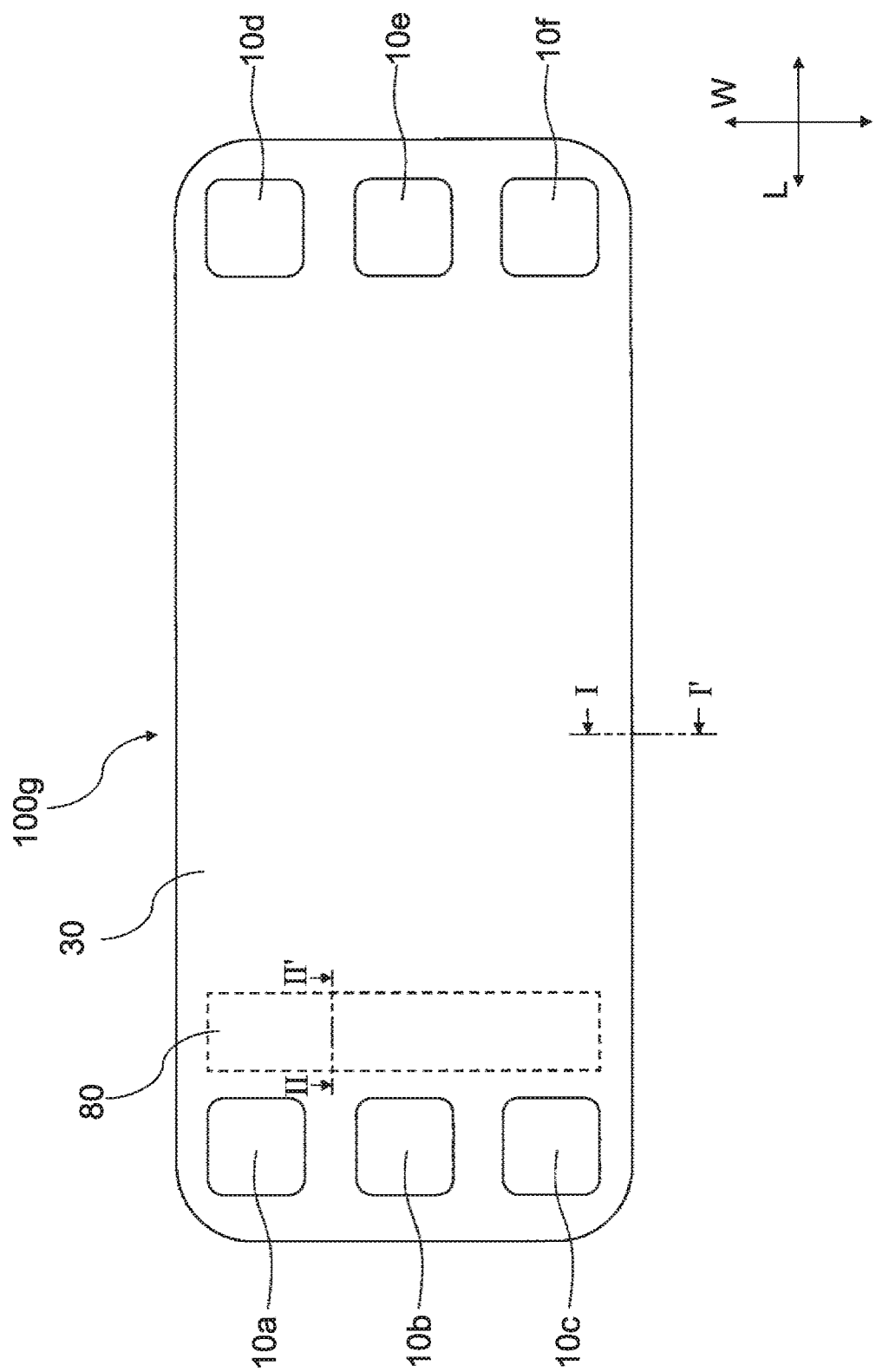
FIG. 9 is a schematic view of a fuel-cell unit cell 100g according to a seventh embodiment of this disclosure as seen from the side of the first separator 30.

As such a position, the second part may be located in areas adjacent to the first gas pass-through openings 10a, 10f, the coolant pass-through openings 10b, 10e, and the second gas pass-through openings 10c, 10d, like the area where section II-II' of FIG. 9 is located.

At the second part of the fuel-cell unit cell of this disclosure: the second separator may have a reactant gas flow passage; a second cover plate may be disposed between the second separator and the second gas diffusion layer, between the second separator and the outer peripheral edge portion of the first gas diffusion layer, and between the second separator and the support frame; between the membrane-electrode assembly and the portion of the first gas diffusion layer on the inner side from the outer peripheral edge portion thereof, the bonding layer may bond the membrane-electrode assembly and the portion together; between the outer peripheral edge portion of the first gas diffusion layer and the second cover plate, the bonding layer may be bonded to the second cover plate; between the support frame and the outer peripheral edge portion of the first gas diffusion layer, between the support frame and the first separator, and/or between the support frame and the second separator, the bonding layer may bond the support frame and the outer peripheral edge portion or the separator together; and the bonding layer may be thus separated from the reactant gas flow passage of the second separator.

At the second part of the fuel-cell unit cell of this disclosure: the first separator may also have a reactant gas flow passage; a first cover plate may be disposed between the first separator and the first gas diffusion layer and between the first separator and the support frame; between the support frame and the first cover plate, the bonding layer may bond these parts together; and the bonding layer may be thus separated from the reactant gas flow passages of the first separator and the second separator.

When the fuel-cell unit cell of this disclosure has the structure in which the support frame is disposed apart from the membrane-electrode assembly so as to surround the membrane-electrode assembly, and is disposed between the outer peripheral edge portion of the first gas diffusion layer and the second separator in the thickness direction of the fuel-cell unit cell, at the second part of the fuel-cell unit cell of this disclosure: between the membrane-electrode assembly and the portion of the first gas diffusion layer on the inner side from the outer peripheral edge portion thereof, the bonding layer may bond the membrane-electrode assembly and the portion together; between the outer peripheral edge portion of the first gas diffusion layer and the second cover plate, the bonding layer may be bonded to the second cover plate; between the support frame and the outer peripheral edge portion of the first gas diffusion layer and/or between the support frame and the second separator, the bonding layer may bond the support frame and the outer peripheral edge portion or the separator together; and the bonding layer may be thus separated from the reactant gas flow passage of the second separator.

When the support frame has the same configuration, at the second part of the fuel-cell unit cell of this disclosure: the first cover plate may be disposed between the first separator and the first gas diffusion layer and between the first separator and the support frame; between the support frame and the first cover plate, the bonding layer may bond these parts together; between the support frame and the first separator, the bonding layer may bond also these parts together; and the bonding layer may be thus separated from the reactant gas flow passage of the first separator.

When the fuel-cell unit cell of this disclosure has the structure in which the support frame is disposed apart from the first gas diffusion layer so as to surround the first gas diffusion layer in an in-plane direction of the fuel-cell unit cell, at the second part of the fuel-cell unit cell of this disclosure: between the membrane-electrode assembly and the portion of the first gas diffusion layer on the inner side from the outer peripheral edge portion thereof, the bonding layer may bond the membrane-electrode assembly and the portion together; between the outer peripheral edge portion of the first gas diffusion layer and the second cover plate, the bonding layer may be bonded to the second cover plate; between the support frame and the first separator and/or between the support frame and the second cover plate, the bonding layer may bond these parts together; and the bonding layer may be thus separated from the reactant gas flow passage of the second separator.

When the support frame has the same configuration, at the second part of the fuel-cell unit cell of this disclosure: the first separator may also have a reactant gas flow passage; a first cover plate may be disposed between the first separator and the outer peripheral edge portion of the first gas diffusion layer and between the first separator and the support frame; between the second cover plate and the first cover plate, the bonding layer may bond these parts together; between the support frame and the first cover plate, the bonding layer may bond these parts together; and the bonding layer may be thus separated from the reactant gas flow passage of the first separator.

Here, the reactant gas flow passage is a flow passage that is used to supply a reactant gas, supplied from the outside of the fuel-cell unit cell, to the gas diffusion layer of the fuel-cell unit cell, or to discharge a reactant gas that has not been consumed in cell reactions to the outside of the fuel-cell unit cell. Examples of the reactant gas include an anode gas, such as a hydrogen gas, and a cathode gas, such as an oxygen gas.

Since the second part of the fuel-cell unit cell of this disclosure has the above-described configuration, the first and second cover plates make it less likely that the bonding layer may penetrate into and close the reactant gas flow passage. Moreover, as high mechanical strength as at the first part can be achieved at the second part.

Figure 10:
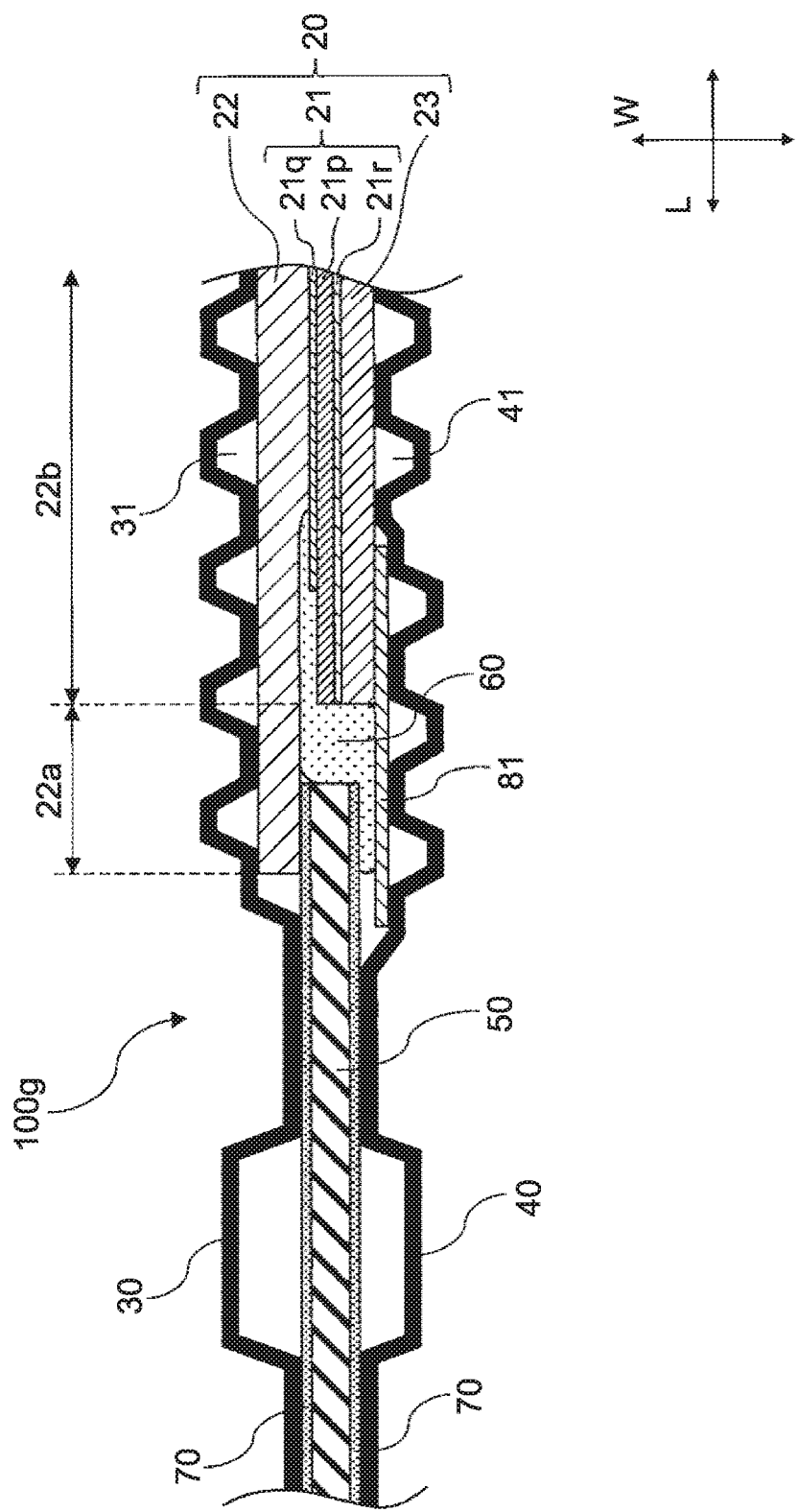
FIG. 10 is a sectional view of the fuel-cell unit cell 100g according to the seventh embodiment of this disclosure, taken along section II-II' of FIG. 9.
Figure 11:
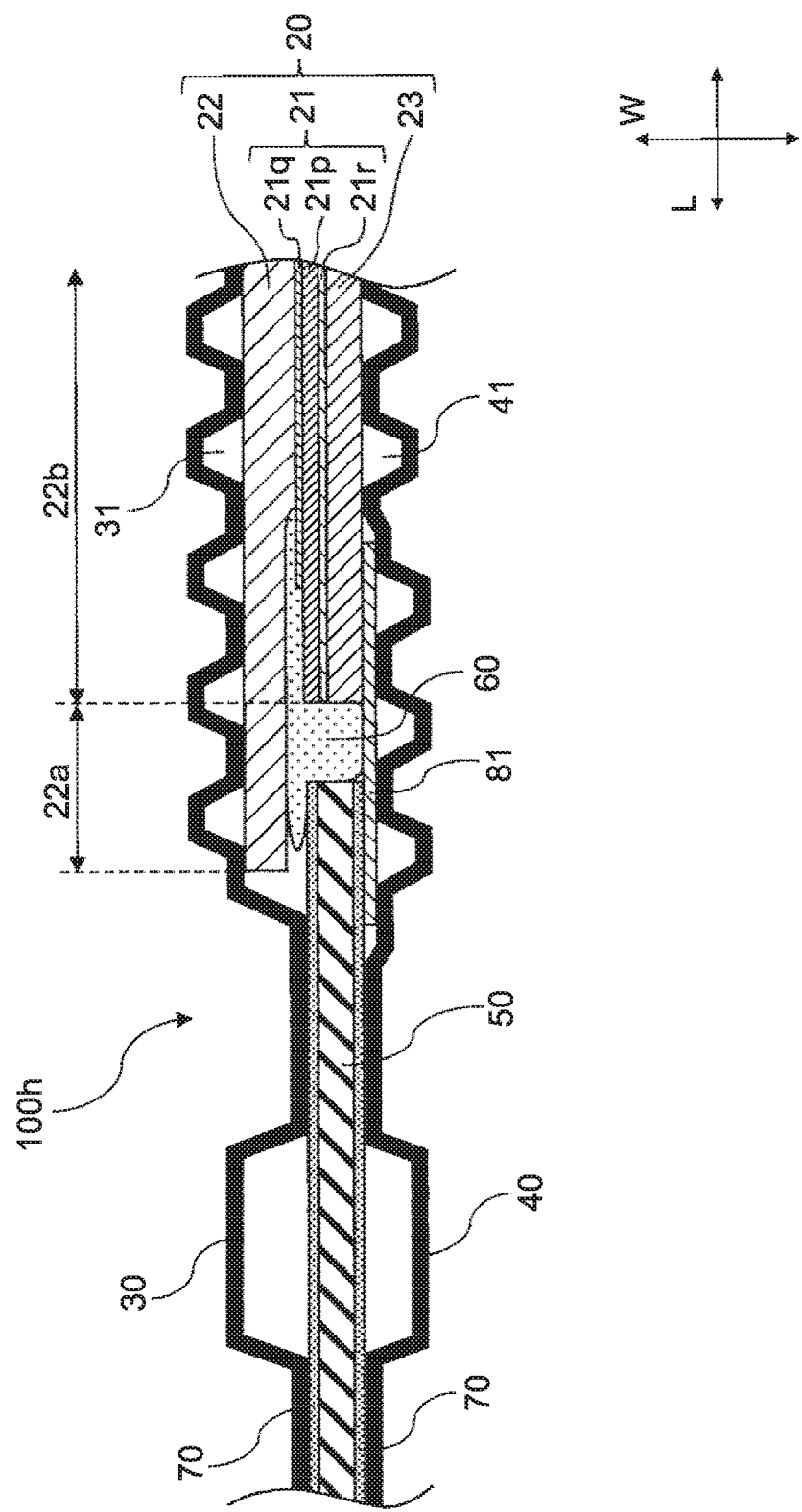
FIG. 11 is a sectional view of a fuel-cell unit cell 100h according to an eighth embodiment of this disclosure, taken along a section similar to section II-II' of FIG. 9.
Figure 12:
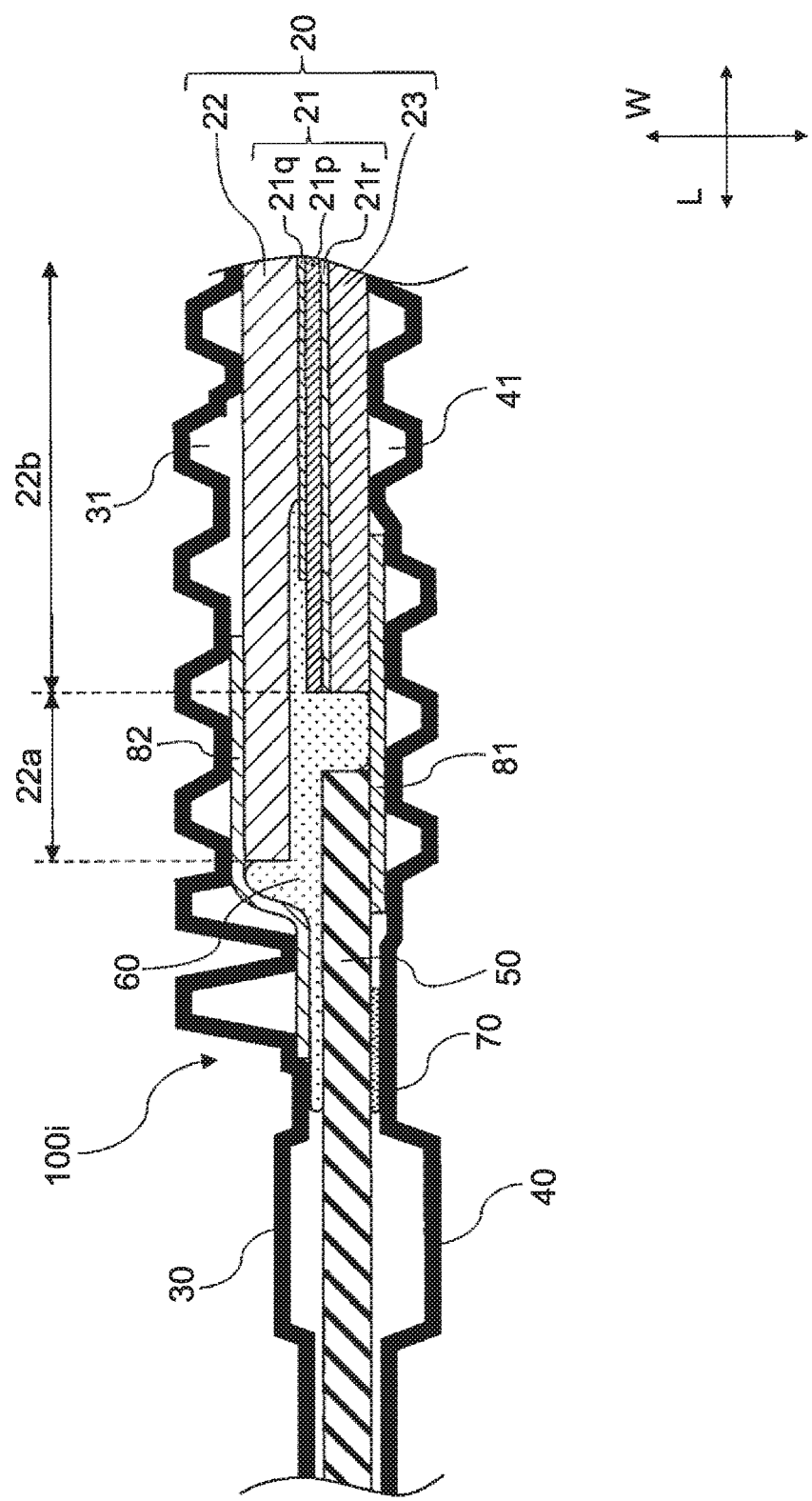
FIG. 12 is a sectional view of a fuel-cell unit cell 100i according to a ninth embodiment of this disclosure, taken along a section similar to section II-II' of FIG. 9.

When the fuel-cell unit cell of this disclosure has the structure in which the support frame is disposed apart from the membrane-electrode assembly so as to surround the membrane-electrode assembly, and is disposed between the outer peripheral edge portion of the first gas diffusion layer and the second separator in the thickness direction of the fuel-cell unit cell, the second part of the fuel-cell unit cell of this disclosure may specifically have, for example, the configurations as shown in FIG. 10 to FIG. 12.

FIG. 10 is a sectional view of a fuel-cell unit cell 100g according to a seventh embodiment of this disclosure, taken along section I-II' of FIG. 9. In FIG. 9, a cover plate 80 is disposed in an area adjacent to the first gas pass-through opening 10a, the coolant pass-through opening 10b, and the second gas pass-through opening 10c.

As shown in FIG. 10, at a second part of the fuel-cell unit cell 100g according to the seventh embodiment of this disclosure: the second separator 40 has reactant gas flow passages 41; a second cover plate 81 is disposed between the second separator 40 and the second gas diffusion layer 23, between the second separator 40 and the outer peripheral edge portion 22a of the first gas diffusion layer 22, and between the second separator 40 and the support frame 50; between the membrane-electrode assembly 21 and the portion 22b of the first gas diffusion layer 22 on the inner side from the outer peripheral edge portion thereof, the bonding layer 60 bonds the membrane-electrode assembly 21 and the portion 22b together; between the outer peripheral edge portion 22a of the first gas diffusion layer 22 and the second cover plate 81, the bonding layer 60 is bonded to the second cover plate 81; between the support frame 50 and the second separator 40, the bonding layer 60 bonds these parts together; and the bonding layer 60 is thus separated from the reactant gas flow passages 41 of the second separator 40.

FIG. 11 is a sectional view of a fuel-cell unit cell 100h according to an eighth embodiment of this disclosure, taken along a section similar to section II-II' of FIG. 9.

As shown in FIG. 11, the fuel-cell unit cell 100h according to the eighth embodiment of this disclosure has the same structure as the fuel-cell unit cell 100g according to the seventh embodiment of this disclosure, except that the bonding layer 60 bonds the support frame 50 and the first gas diffusion layer 22 together instead of bonding the support frame 50 and the second separator 40 together.

FIG. 12 is a sectional view of a fuel-cell unit cell 100i according to a ninth embodiment of this disclosure, taken along a section similar to section II-II' of FIG. 9.

As shown in FIG. 12, a second part of the fuel-cell unit cell 100i according to the ninth embodiment of this disclosure has a structure in which: the first separator 30 has reactant gas flow passages 31; a first cover plate 82 is disposed between the first separator 30 and the first gas diffusion layer 22 and between the first separator 30 and the support frame 50; between the support frame 50 and the first cover plate 82, the bonding layer 60 bonds these parts together; and the bonding layer 60 is thus separated from the reactant gas flow passages of the first separator 30.

Figure 13:
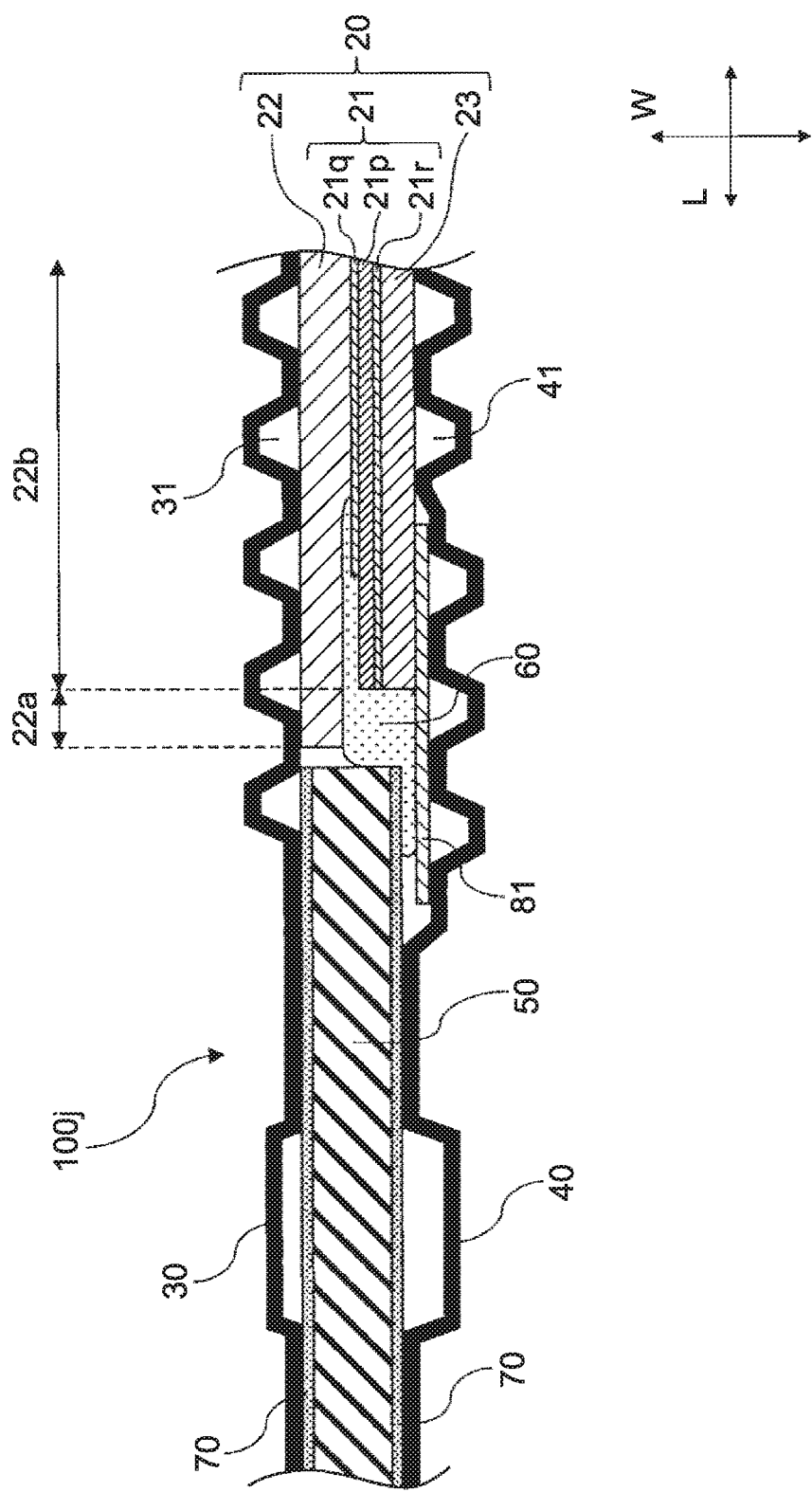
FIG. 13 is a sectional view of a fuel-cell unit cell 100j according to a tenth embodiment of this disclosure, taken along a section similar to section II-II' of FIG. 9.
Figure 14:
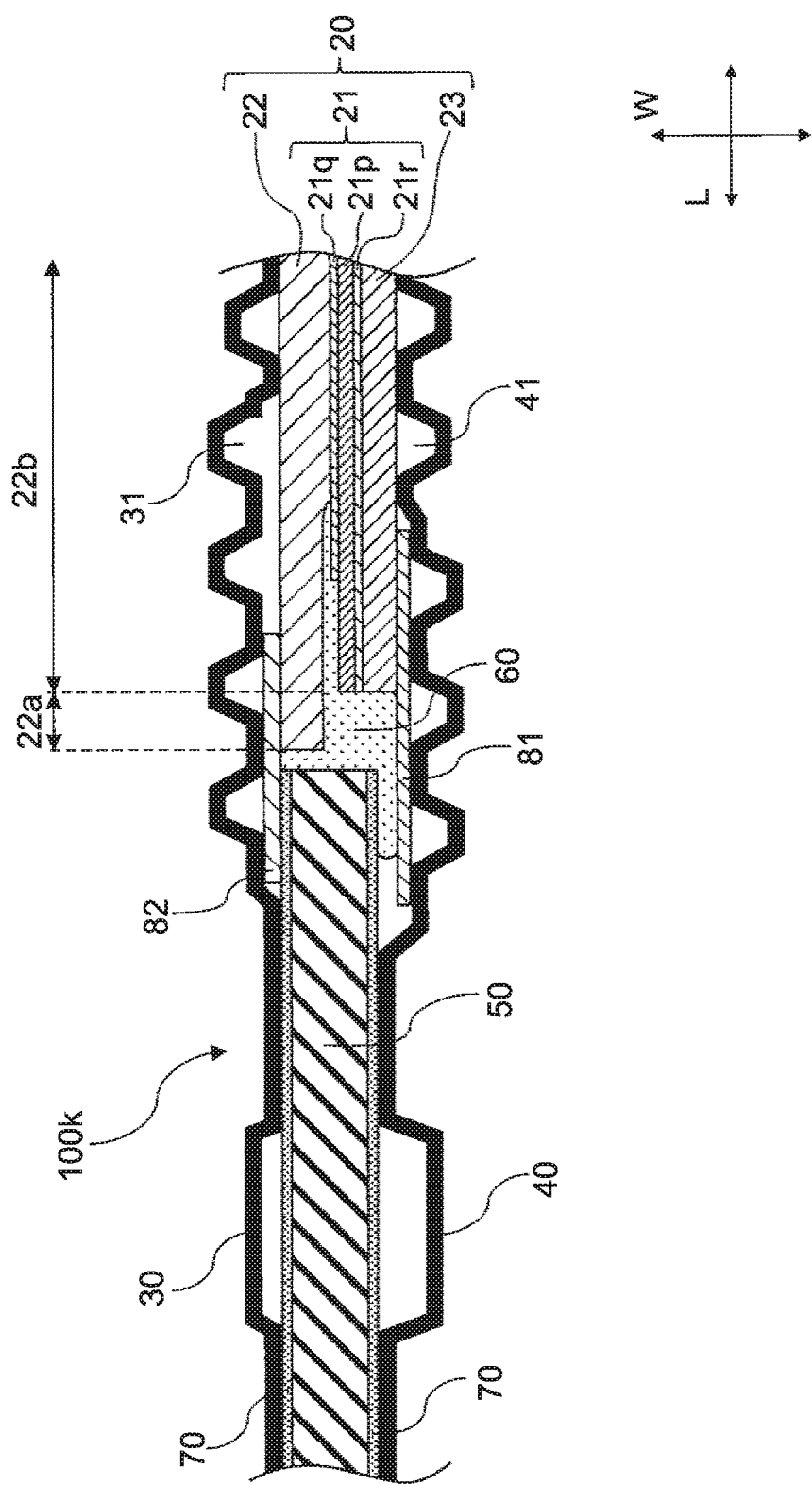
FIG. 14 is a sectional view of a fuel-cell unit cell 100k according to an eleventh embodiment of this disclosure, taken along a section similar to section II-II' of FIG. 9.
Figure 15:
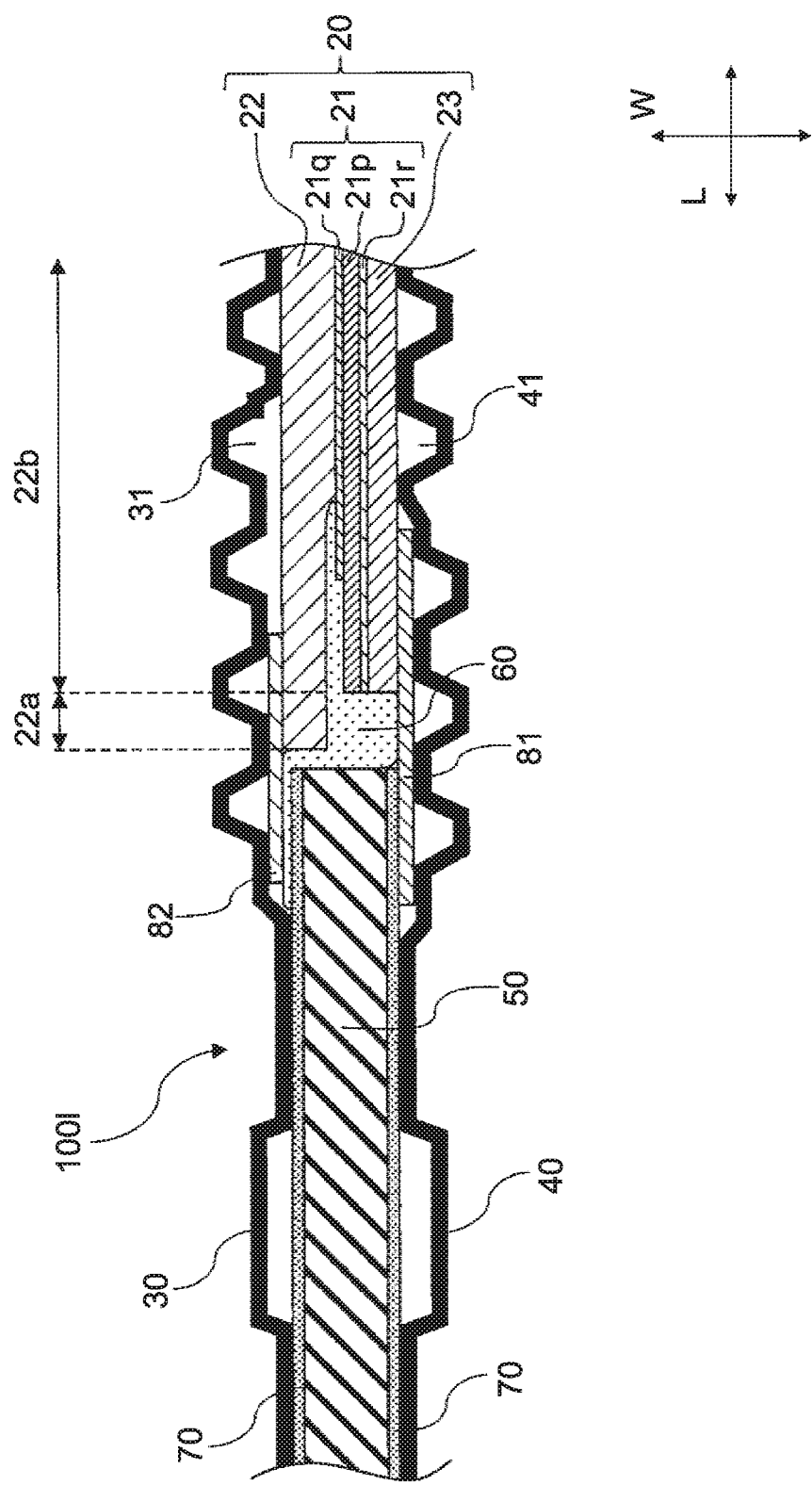
FIG. 15 is a sectional view of a fuel-cell unit cell 100*l* according to a twelfth embodiment of this disclosure, taken along a section similar to section II-II' of FIG. 9.

When the fuel-cell unit cell of this disclosure has the structure in which the support frame is disposed apart from the first gas diffusion layer so as to surround the first gas diffusion layer in an in-plane direction of the fuel-cell unit cell, the second part of the fuel-cell unit cell of this disclosure may specifically have, for example, the configurations as shown in FIG. 13 to FIG. 15.

FIG. 13 is a sectional view of a fuel-cell unit cell 100j according to a tenth embodiment of this disclosure, taken along a section similar to section II-II' of FIG. 9.

As shown in FIG. 13, at the second part of the fuel-cell unit cell 100j according to the tenth embodiment of this disclosure: the second separator 40 has the reactant gas flow passages 41; the second cover plate 81 is disposed between the second separator 40 and the second gas diffusion layer 23, between the second separator 40 and the outer peripheral edge portion 22a of the first gas diffusion layer 22, and between the second separator 40 and the support frame 50; between the membrane-electrode assembly 21 and the portion 22b of the first gas diffusion layer 22 on the inner side from the outer peripheral edge portion thereof, the bonding layer 60 bonds the membrane-electrode assembly 21 and the portion 22b together; between the outer peripheral edge portion 22a of the first gas diffusion layer 22 and the second cover plate 81, the bonding layer 60 is bonded to the second cover plate 81; between the support frame 50 and the second cover plate 81, the bonding layer 60 bonds these parts together; and the bonding layer 60 is thus separated from the reactant gas flow passages 41 of the second separator 40.

FIG. 14 is a sectional view of a fuel-cell unit cell 100k according to an eleventh embodiment of this disclosure, taken along a section similar to section II-II' of FIG. 9.

As shown in FIG. 14, at a second part of the fuel-cell unit cell 100k according to the eleventh embodiment of this disclosure: the first separator 30 has the reactant gas flow passages 31; the first cover plate 82 is disposed between the first separator 30 and the outer peripheral edge portion 22a of the first gas diffusion layer 22 and between the first separator 30 and the support frame 50; between the second cover plate 81 and the first cover plate 82, the bonding layer 60 bonds these parts together; and the bonding layer 60 is thus separated from the reactant gas flow passages 31 of the first separator 30. The other configurations of the fuel-cell unit cell 100k are the same as in the fuel-cell unit cell 100j according to the tenth embodiment of this disclosure.

FIG. 15 is a sectional view of a fuel-cell unit cell 100l according to a twelfth embodiment of this disclosure, taken along a section similar to section II-II' of FIG. 9.

As shown in FIG. 15, a second part of the fuel-cell unit cell 100l according to the twelfth embodiment of this disclosure has the same structure as that of the fuel-cell unit cell 100k according to the eleventh embodiment of this disclosure, except that the bonding layer 60 bonds also the support frame 50 and the first cover plate 82 together.

Electrode Stack (I) The electrode stack has the following:
  (a) a membrane-electrode assembly in which electrode catalyst layers are respectively laid on both surfaces of an electrolyte layer;
  (b) a first gas diffusion layer laid on a first surface of the membrane-electrode assembly such that an outer peripheral edge portion thereof protrudes from the first surface of the membrane-electrode assembly; and
  (c) a second gas diffusion layer laid on a second surface of the membrane-electrode assembly.

That the support frame is "disposed apart from the membrane-electrode assembly so as to surround the membrane-electrode assembly" means that the support frame is disposed so as to surround the membrane-electrode assembly, without being in contact with the membrane-electrode assembly, in an in-plane direction of the fuel-cell unit cell.

As a more specific configuration, for example, the support frame may be disposed apart from the membrane-electrode assembly so as to surround the membrane-electrode assembly, and may be disposed between the outer peripheral edge portion of the first gas diffusion layer and the second separator in the thickness direction of the fuel-cell unit cell.

Further, for example, the support frame may be disposed apart from the first gas diffusion layer so as to surround the first gas diffusion layer in an in-plane direction of the fuel-cell unit cell.

Membrane-Electrode Assembly

The membrane-electrode assembly has the electrolyte layer and the electrode catalyst layers respectively laid on both surfaces of the electrolyte layer.

Electrolyte Layer

An arbitrary material that can be used for an electrolyte layer of a fuel-cell unit cell can be used as the material of the electrolyte layer. Examples of such a material include fluorine polymer membranes having ion conductivity, more specifically, ion-exchange membranes having proton conductivity and containing perfluorosulfonic acid.

Electrode Catalyst Layer

Examples of the electrode catalyst layer include an anode catalyst layer and a cathode catalyst layer. The anode catalyst layer and the cathode catalyst layer may be catalyst layers in which a catalytic metal is supported by a carrier.

The catalytic metal may be an arbitrary catalytic metal that is used for a fuel cell catalyst. Examples of such a catalytic metal include Pt, Pd, Rh, and alloys containing these metals.

The carrier may be an arbitrary carrier that is used for a fuel cell catalyst. Examples of such a carrier include carbon carriers, more specifically, carbon particles of glassy carbon, carbon black, active carbon, coke, natural graphite, artificial graphite, or the like.

Gas Diffusion Layer

In this disclosure, the first gas diffusion layer is laid on the first surface of the membrane-electrode assembly such that the outer peripheral edge portion thereof protrudes from the first surface of the membrane-electrode assembly, and the second gas diffusion layer is laid on the second surface of the membrane-electrode assembly.

Of the first gas diffusion layer and the second gas diffusion layer, one is an anode gas diffusion layer and the other is a cathode gas diffusion layer.

The material of the first gas diffusion layer and the second gas diffusion layer may be an arbitrary material that can be used for an anode gas diffusion layer and a cathode gas diffusion layer of a fuel cell catalyst. Examples of such a material include electrically conductive porous materials. More specifically, examples of such porous materials include porous carbon materials, such as carbon paper, carbon cloth, and glasslike carbon, and porous metal materials, such as metal mesh and foam metal.

Support Frame

The support frame is disposed so as to surround the first gas diffusion layer.

The support frame is made of an arbitrary material that can provide electrical insulation and airtightness. Examples of such a material include crystalline polymers, more specifically, engineering plastics. Examples of engineering plastics include polyethylene naphthalate (PEN) resins and polyethylene terephthalate (PET) resins.

Separator

Examples of the separator include a first separator and a second separator.

The first separator is laid on a side of the electrode stack on which the first gas diffusion layer is located, in contact with the first gas diffusion layer, and is fixed to the support frame.

The first separator may have a plurality of grooves in a surface facing the first gas diffusion layer, and the reactant gas flow passages may be formed by these grooves. The grooves may have an arbitrary shape, for example, a serpentine shape, as long as the grooves can supply the reactant gas to the first gas diffusion layer.

The first separator may have a first gas pass-through opening, a coolant pass-through opening, and a second gas pass-through opening.

The material of the first separator may be an arbitrary material that can be used for a separator of a fuel-cell unit cell, and may be a material having gas impermeability and electrical conductivity. Examples of such a material include dense carbon formed by compressing carbon so as to have gas impermeability, and metal plates formed by pressing.

The second separator is laid on a side of the electrode stack on which the second gas diffusion layer is located, in contact with the second gas diffusion layer, and is fixed to the support frame.

The material and structure of the second separator may be the same as those of the first separator.

Bonding Layer

As the bonding layer, a layer of an arbitrary adhesive can be used that can bond together the first separator, the first gas diffusion layer, the membrane-electrode assembly, the support frame, and the second separator, and that can keep these members bonded together under the service conditions of the fuel-cell unit cell.

Examples of such an adhesive include, but are not limited to, adhesive resins such as thermoplastic resins, thermosetting resins, and UV-curing resins. When a thermoplastic resin is used as the adhesive, that resin preferably has a softening point higher than the temperature of heat generated during usage of the fuel-cell unit cell.

Cover Plate

The material of the first and second cover plates is not particularly limited as long as it is a sheet-shaped material that can be bonded to the first or second gas diffusion layer, the membrane-electrode assembly, and the support frame by the bonding layer. Examples of such a material include titanium, stainless steel, polyphenylene sulfide (PPS), and polypropylene (PP).

None of the drawings used to describe this disclosure is intended to limit the configuration, structure, and other features of the fuel-cell unit cell of this disclosure.

What is claimed is:

1. A fuel-cell unit cell comprising:
   (I) an electrode stack having
      (a) a membrane-electrode assembly in which electrode catalyst layers are respectively laid on both surfaces of an electrolyte layer,
      (b) a first gas diffusion layer laid on a first surface of the membrane-electrode assembly such that an outer peripheral edge portion of the first gas diffusion layer protrudes from an outer periphery of the membrane-electrode assembly, and
      (c) a second gas diffusion layer laid on a second surface of the membrane-electrode assembly;
   (II) a support frame disposed apart from the membrane-electrode assembly so as to surround the membrane-electrode assembly;
   (Ill) a first separator that is laid on a side of the electrode stack on which the first gas diffusion layer is located, in contact with the first gas diffusion layer, and that is fixed to the support frame; and
   (IV) a second separator that is laid on a side of the electrode stack on which the second gas diffusion layer is located, in contact with the second gas diffusion layer, and that is fixed to the support frame,
   wherein, at a first part of the fuel-cell unit cell:
   the fuel-cell unit cell has a bonding layer;
   between the membrane-electrode assembly and a portion of the first gas diffusion layer on an inner side from the outer peripheral edge portion, the bonding layer bonds the membrane-electrode assembly and the portion together; and
   the support frame and the outer peripheral edge portion of the first gas diffusion layer are bonded together by the bonding layer, and at least one of between the support frame and the first separator, or between the support frame and the second separator, the support frame and the respective separator are bonded together by the bonding layer; and
   wherein, at a second part of the fuel-cell unit cell:
   the second separator has a reactant gas flow passage;
   a second cover plate is disposed between the second separator and the second gas diffusion layer, between the second separator and the outer peripheral edge portion of the first gas diffusion layer, and between the second separator and the support frame;

between the membrane-electrode assembly and the portion of the first gas diffusion layer on the inner side from the outer peripheral edge portion, the bonding layer bonds the membrane-electrode assembly and the portion together;

between the outer peripheral edge portion of the first gas diffusion layer and the second cover plate, the bonding layer is bonded to the second cover plate;

the support frame and the outer peripheral edge portion of the first gas diffusion layer are bonded together by the bonding layer, and at least one of between the support frame and the first separator, or between the support frame and the second separator, the support frame and the respective separator are bonded together by the bonding layer; and the bonding layer is thus separated from the reactant gas flow passage of the second separator.

2. The fuel-cell unit cell according to claim 1, wherein the support frame is disposed between the outer peripheral edge portion of the first gas diffusion layer and the second separator in a thickness direction of the fuel-cell unit cell.

3. The fuel-cell unit cell according to claim 1, wherein the support frame is disposed apart from the first gas diffusion layer so as to surround the first gas diffusion layer.

4. The fuel-cell unit cell according to claim 1, wherein, at the second part of the fuel-cell unit cell:

the first separator also has a reactant gas flow passage;

a first cover plate is disposed between the first separator and the first gas diffusion layer and between the first separator and the support frame;

between the support frame and the first cover plate, the bonding layer bonds the support frame and the first cover plate together; and the bonding layer is thus separated from the reactant gas flow passage of the first separator.

* * * * *